(12) United States Patent
Schuller et al.

(10) Patent No.: US 7,587,311 B2
(45) Date of Patent: Sep. 8, 2009

(54) DEVICE AND METHOD FOR EMBEDDING BINARY PAYLOAD IN A CARRIER SIGNAL

(75) Inventors: Gerald Schuller, Erfurt (DE); Ralf Geiger, Ilmenau (DE); Juergen Koller, Munich (DE)

(73) Assignee: Fraunhofer-Gesellschaft zur Foerderung der Angewandten Forschung E.V. (DE)

( * ) Notice: Subject to any disclaimer, the term of this patent is extended or adjusted under 35 U.S.C. 154(b) by 472 days.

(21) Appl. No.: 11/274,836

(22) Filed: Nov. 15, 2005

(65) Prior Publication Data

US 2006/0095253 A1 May 4, 2006

Related U.S. Application Data

(63) Continuation of application No. PCT/EP2004/004481, filed on Apr. 28, 2004.

(30) Foreign Application Priority Data

May 15, 2003 (DE) ................................ 103 21 983

(51) Int. Cl.
*G10L 19/00* (2006.01)
(52) U.S. Cl. .................................. 704/200.1
(58) Field of Classification Search ................ 704/273, 704/200.1
See application file for complete search history.

(56) References Cited

U.S. PATENT DOCUMENTS 6,345,100 B1  2/2002  Levine ..................... 380/205

(Continued)

FOREIGN PATENT DOCUMENTS

DE  101 29 239 C1  10/2002

(Continued)

OTHER PUBLICATIONS

English Translation of the International Preliminary Examination Report for PCT-EP2004/004481 dated Apr. 13, 2006.

(Continued)

*Primary Examiner*—David R Hudspeth
*Assistant Examiner*—Jakieda R Jackson
(74) *Attorney, Agent, or Firm*—Thomas, Kayden, Horstemeyer & Risley, LLP.

(57) ABSTRACT

For embedding binary payload in a carrier signal, which, for example, is an audio signal, a sequence of time-discrete values of the carrier signal is converted to the frequency domain by means of an integer transform algorithm to obtain binary spectral representation values. Bits of the binary spectral representation values with a valency less than signal limit valency are determined and set according to the payload. The signal limit valency for a spectral representation value is less than the valency of the leading bit of this spectral representation value, so that, with adequate distance, a psychoacoustic transparent insertion of information is achieved. Thus a modified spectral representation with inserted information is generated which is finally converted back to the time domain using an integer back transform algorithm. For extracting the payload, the time-discrete signal with the inserted information is again converted to a spectral representation with the integer forward transform algorithm. Furthermore, signal limit valency information is determined to identify the bits of the binary spectral representation values containing no information regarding the carrier signal, but information regarding the payload signal, to extract these bits. The inventive concept is simple in its implementation and may be scaled with respect to the data rate of the information to be inserted.

30 Claims, 9 Drawing Sheets

U.S. PATENT DOCUMENTS

| 2002/0006203 A1 | 1/2002 | Tachibana et al. ........... 380/269 |
| 2002/0164048 A1 | 11/2002 | Bruckstein et al. .......... 382/100 |
| 2003/0081809 A1 | 5/2003 | Fridrich et al. .............. 382/100 |

FOREIGN PATENT DOCUMENTS

| JP | 2000209097 | 7/2000 |
| JP | 2001118330 | 4/2001 |
| WO | WO 97/33391 | 9/1997 |
| WO | WO 01/13552 | 2/2001 |

OTHER PUBLICATIONS

Siebenhaar et al., "New High Data Rate Audio Watermarking based on SCS (Scalar Costa Scheme)," Audio Engineering Society Convention Paper 5645, presented at the 113$^{th}$ Convention, Los Angeles, CA, Oct. 5-8, 2002, pp. 1-13.

Ten Kate et al., "A New Surround-Stereo-Surround Coding Technique," J. Audio Eng. Soc., vol. 40, No. 5, May 1992, pp. 376-383.

Gerzon et al., "A High-Rate Buried Data Channel for Audio CD," presented at the 94$^{th}$ AES Convention, Mar. 16-19, 1993, Berlin, Germany, pp. 1-35.

Xuan et al., "Lossless Data Hiding Based on Integer Wavelet Transform," IEEE Workshop, Dec. 2002, St. Thomas, U.S. Virgin Islands, pp. 1-4.

Geiger et al., "INTMDCT—A Link Between Perceptual and Lossless Audio Coding," IEEE International Conf. On Acoustics, Speech, and Signal Processing, 2002, vol. 2, pp. 1813-1816.

Komatsu et al., "Reversible Discrete Cosine Transform," Proceedings of the 1998 IEEE Intern. Conference on Acoustics, Speech, and Signal Processing, 1998, vol. 3, pp. 1769-1772.

Tian, Jun, "High-Capacity Reversible Data Embedding and Content Authentication," 2003 IEEE International Conference on Acoustics, Speech, and Signal Processing, Hong Kong, Apr. 6-10, 2003, vol. 1 of 6, pp. III-517-III-520.

Kim et al., "A Robust Wavelet-Based Digital Watermarking Using Level-Adaptive Thresholding," ICIP 99. Proceedings. 1999 International Conference on Kobe, Japan, Oct. 24-28, 1999, pp. 226-230.

Geiger et al., "Fine Grain Scalable Perceptual and Lossless Audio Coding Based on INTMDCT," 2003 IEEE International Conference on Acoustics, Speech, and Signal Processing, Hong Kong, Apr. 6-10, 2003, vol. 1 of 6, pp. V445-V448.

Geiger et al., "Integer Low Delay and MDCT Filter Banks," Conference Record of the 36$^{th}$ Asilomar Conference on Signals, Systems, & Computers, Pacific Grove, CA, Nov. 3-6, 2002, vol. 1 of 2, pp. 811-815.

Office Action in related Japanese Patent Application mailed May 12, 2009; Application No. 2006-529718.

English Translation of JP Patent Publication No. 2001-118330.

English Translation of JP Patent Publication No. 2000-209097.

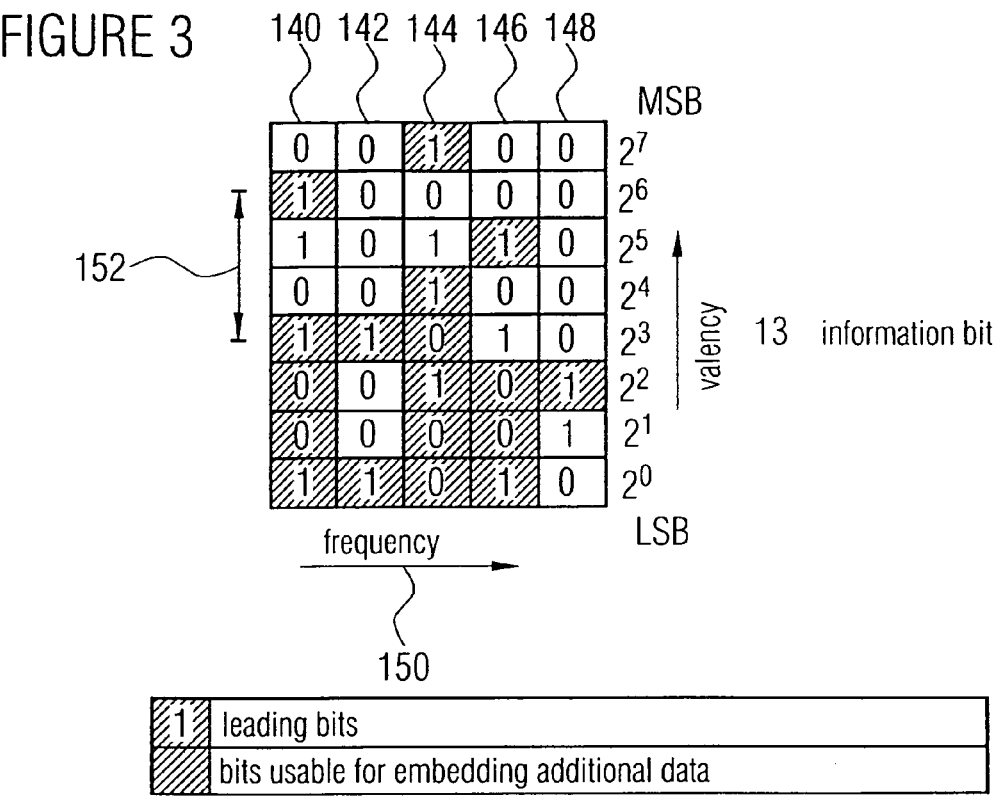
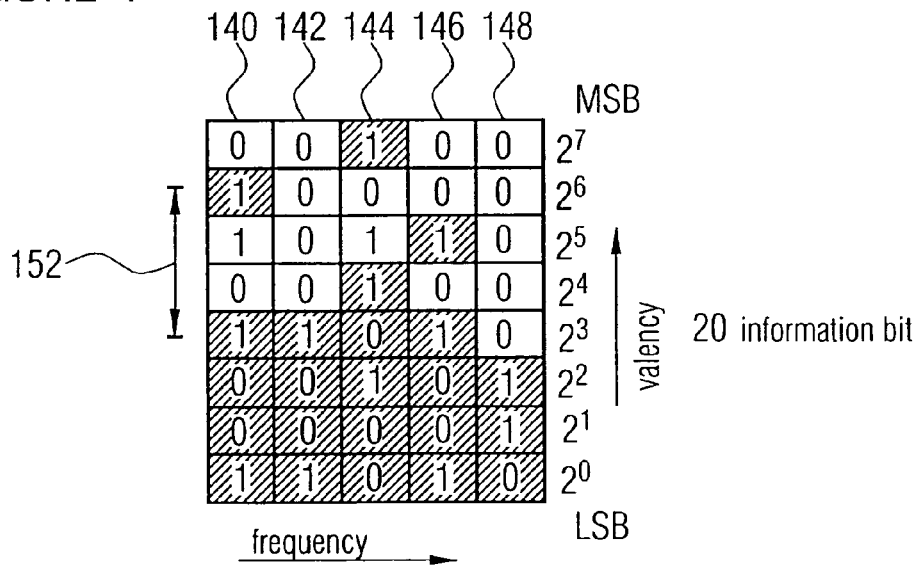

DEVICE AND METHOD FOR EMBEDDING BINARY PAYLOAD IN A CARRIER SIGNAL

CROSS-REFERENCE TO RELATED APPLICATION

This application is a continuation of copending International Application No. PCT/EP04/004481, filed Apr. 28, 2004, which designated the United States and was not published in English, and is incorporated herein by reference in its entirety.

BACKGROUND OF THE INVENTION

1. Field of the Invention

The present invention refers to embedding payload in a carrier signal and extracting payload from the carrier signal, wherein the carrier signal may be an audio signal, a video signal or a multimedia signal including audio and/or video information.

2. Description of Related Art

There are various applications and/or various approaches in the art for embedding additional information in digital signals. Such concepts are known in the art under the keyword watermarking.

From WO 97/33391, a coding method for inserting an inaudible data signal into an audio signal is known. Here, the audio signal in which the inaudible data signal is to be inserted is converted to the frequency domain by means of a Fourier transform or a modified discrete cosine transform in order to determine the masking threshold of the audio signal by means of a psychoacoustic model. The data signal to be inserted into the audio signal is multiplied by a pseudo noise signal to create a frequency-spread data signal. The frequency-spread data signal is then weighted with the psychoacoustic masking threshold such that the energy of the frequency-spread data signal is always below the masking threshold. Finally, the weighted data signal is superimposed on the audio signal whereby an audio signal is produced in which the data signal is inaudibly inserted. On the one hand, the data signal may be used to determine the range of a transmitter. Alternatively, the data signal may be used for labeling audio signals to easily identify possible pirate copies, because each sound carrier, for example in form of a compact disc, is provided with an individual label at the factory. Other described possible applications for the data signal are remote controlling of audio devices in analogy to the "VPS" method in television.

EP 1149480 B1 discloses a method and a device for inserting information into an audio signal and methods and devices for determining information inserted in an audio signal. Here, the information is first processed such that the information to be inserted into the audio signal is distributed over at least two information channels. A first information channel contains copy information typically represented by a relatively small amount of data and serving to prevent illegal copying. Further information for the identification of the audio signal is inserted into a second information channel. The two channels are decodable independently of each other. A different spreading sequence is associated with each of these channels so that each channel is decodable separately from the others.

The main characteristics of such watermarking systems are the influence on the audio quality on the one hand, elevated robustness on the other hand, so that the watermark is safe against illegal interference, and further the watermark data rate. These three objectives oppose each other in that a high level of robustness, for example, implies a loss of data rate or a loss of audio quality. Furthermore, a high data rate will either cause the robustness to suffer or that the audio quality of the signal in which the audio information has been inserted suffers.

In the specialist publication "New High Data Rate Audio Watermarking based on SCS (Scalar Costa Scheme)", S. Siebenhaar, et al., AES Convention Paper 5645, Oct. 5 to 8, 2002, Los Angeles, Calif., USA, an audio watermarking method is described in which the audio signal is first segmented and then windowed and then transformed to the frequency domain. An SCS watermark embedding is performed to then transform the result back to the time domain, subject it to windowing and then, taking block overlap into account, if necessary, finally obtain the audio signal enriched with a watermark again. The SCS algorithm consists in performing a dither quantization of the spectral value levels.

The SCS algorithm is further adapted such that properties of human hearing are taken into account to achieve a psychoacoustic weighting of the SCS algorithm.

The specialist publication "A New Surround-Stereo-Coding Technique", W. Ten Kate, L. Van De Kerkhof and F. Zijderveld, Journal Audio Engineering Society, Vol. 40, No. 5, May 1992, pages 376 to 382, also discloses adding inaudible information to audio signals. More specifically, an audio signal is filtered by means of a filter bank and then down-sampled. More specifically, the samples in each subband are grouped into consecutive time windows. Then, the power spectrum is calculated of each block, which is then used to calculate the masking threshold. The psychoacoustic marking threshold determines the maximum allowable power of a signal to be added. This value is determined subband-wise. Subsequently, the data to be inserted are weighted using this calculated masking threshold and added to the individual subbands, whereupon an upsampling filter is used which has a downstream filter bank to finally obtain the audio signal including the embedded information.

The specialist publication "A High Rate Buried Data Chanel for Audio CD", M. Gerzon, AES Preprint 3551, 94th AES Convention, Mar. 16 to 19, 1993, Berlin, discloses a technique for embedding a channel with a high data rate of up to 360 kBit per second or more into an audio CD without significantly affecting CD quality. The new data channel may be used to accommodate high quality data-reduced related audio channels or even to accommodate data-compressed video or computer data while, at the same time, maintaining compatibility with existing audio CD players. More specifically, a number (up to 4 per channel) of the least significant bits of the audio words are replaced by other data. Furthermore, psychoacoustic noise forming techniques associated with a noise-formed subtractive dither are used to reduce the audibility of the resulting added noise to a subjectively discernable level equal to the noise level of a conventional CD. More specifically, a pseudo random coding/decoding process is used which only operates on the LSB data stream of the audio samples without there being used additional synchronization signals to randomize the added LSB data carrying the inserted information. Due to the fact that it is based on a pseudo random sequence, this randomization may be reversed using this pseudo random sequence in the extractor.

The specialist publication "Lossless Data Hiding Based on Integer Wavelet Transform", G. Xuan et al., IEEE Workshop, December 2002, St. Thomas, Virgin Islands, pp. 1-4, discloses a data embedding algorithm allowing a high data rate and based on an integral wavelet transform capable of recovering the original image from the image with the embedded data. The marking is further performed such that no visible interferences occur due to the inserted data. For this, the original image is subjected to an integer wavelet transform after preprocessing to obtain wavelet coefficients. The integer wavelet transform has been included into JPEG 2000. This technique is based on the application of lifting schemes. The technique is based on bits in a bit level of the wavelet coefficients being compressed so that there remains space to write data into the space cleared by the compression of the bit levels. For this, a compressed wavelet coefficient representation is generated from the original wavelet coefficients for the compression, the representation requiring less bits than the original wavelet coefficient representation, wherein the difference of the bits for the original representation and the bits of the compressed representation is used to insert data to be hidden. Then an inverse integer wavelet transform is performed to finally obtain the marked image. In particular, arithmetic coding is employed for the compression in the selected bit levels to losslessly compress binary zeros and ones.

As has been mentioned, a compromise between inaudibility, robustness and high data rate has to be sought for the methods for embedding data in audio signals. In cases where not so much robustness but rather a high data rate is required, i.e. where, for example, there is only a wire-bound transmission or the piece is passed on to a sound carrier, i.e. where no free-space transmission takes place, a compromise may be made with respect to robustness in favor of the high data rate. The same applies for applications where the embedded information is not intended for the protection against illegal copying etc. but rather, for example, for adding additional information to an audio signal which is not intended to pursue illegal distribution, but is intended to provide the consumer of the audio signal with further information and/or data as an additional service.

Furthermore, there is a need for a concept which is simple in its implementation and also modest with respect to the computing time requirements at least on the decoder side. In particular, the decoder will often be in the hands of the customers and will typically not provide particularly high computing and storage resources due to the fact that it will have to compete with respect to the price on the market.

SUMMARY OF THE INVENTION

It is an object of the present invention to provide an efficient concept for embedding binary payload into carrier signals.

In accordance with a first aspect, the present invention provides a device for embedding binary payload into a carrier signal having a first sequence of discrete values, the device having: means for converting the first sequence of discrete values to a spectral representation using a forward integer transform algorithm configured to provide a set of integer binary spectral representation values representing frequencies in an ascending order, wherein spectral representation values to be modified have bits, and wherein a different valency is associated with each bit of a spectral representation value to be modified, wherein a set bit with a highest valency in the bits of the spectral representation value is a leading bit of the spectral representation value, and wherein all remaining bits of the spectral representation value have a lower valency than the leading bit; means for determining signal limit valencies for the spectral representation values, wherein the signal limit valencies are at least one valency level below a valency of the respective leading bit of the spectral representation values; means for setting bits of the spectral representation values whose valencies are equal to the signal limit valency or less than the signal limit valency according to the binary payload to obtain modified spectral representation values, wherein bits whose valencies are greater than the signal limit valencies are not available for payload embedding; and means for converting a set of integer binary spectral representation values, in which the modified spectral representation values are contained instead of the spectral representation values to be modified, to a second sequence of discrete values using a backward integer transform algorithm so that the payload is embedded in the second sequence of values.

In accordance with a second aspect, the present invention provides a method for embedding binary payload into a carrier signal having a first sequence of discrete values, the method having the steps of: converting the first sequence of discrete values to a spectral representation using a forward integer transform algorithm configured to provide a set of integer binary spectral representation values representing frequencies in an ascending order, wherein spectral representation values to be modified have bits, and wherein a different valency is associated with each bit of a spectral representation value to be modified, wherein a set bit with a highest valency in the bits of the spectral representation value is a leading bit of the spectral representation value, and wherein all remaining bits of the spectral representation value have a lower valency than the leading bit; determining signal limit valencies for the spectral representation values, wherein a signal limit valency is at least one valency level below a valency of the leading bit of the respective spectral representation value; setting bits of the spectral representation values whose valencies are equal to the signal limit valency or less than the signal limit valency according to the binary payload to obtain modified spectral representation values, wherein bits whose valencies are greater than the signal limit valencies are not available fo payload embedding; and converting a set of integer binary spectral representation values, in which the modified spectral representation values are contained instead of the spectral representation values to be modified, to a second sequence of discrete values using a backward integer transform algorithm so that the payload is embedded in the second sequence of values.

In accordance with a third aspect, the present invention provides a device for extracting payload from a modified carrier signal having a second sequence of discrete values in which the payload is inserted, wherein the payload is inserted by setting bits of spectral representation values which are spectral representation values from a set of integer binary spectral representation values, wherein the spectral representation values have bits, wherein a different valency is associated with each bit of a spectral representation value, wherein a set bit with a highest valency in the bits of the spectral representation value is a leading bit of the spectral representation value, and wherein all remaining bits of the spectral representation value have a lower valency than the leading bit, wherein the set of integer spectral representation values is generated via converting a first sequence of discrete values to a spectral representation using a forward integer transform algorithm, wherein the transform algorithm is configured to provide the set of integer binary spectral representation values representing frequencies in an ascending order, and wherein the set bits of the spectral representation value are bits whose valency is less than or equal to a signal limit valency, the device having: means for converting the second sequence of samples using the forward integer transform algorithm to obtain an extraction set of integer binary spectral representation values representing frequencies in an ascending order; means for providing information on signal limit valencies associated with the spectral representation values; and means for extracting only the bits of the spectral representation values whose valencies are less than or equal to the signal limit valencies associated with the spectral representation values, wherein the extracted bits represent the binary payload.

In accordance with a fourth aspect, the present invention provides a method for extracting payload from a modified carrier signal having a second sequence of discrete values in which the payload is inserted, wherein the payload is inserted by setting bits of spectral representation values which are spectral representation values from a set of integer binary spectral representation values, wherein the spectral representation values have bits, wherein a different valency is associated with each bit of a spectral representation value, wherein a set bit with a highest valency in the bits of the spectral representation value is a leading bit of the spectral representation value, and wherein all remaining bits of the spectral representation value have a lower valency than the leading bit, wherein the set of integer spectral representation values has been generated via converting a first sequence of discrete values to a spectral representation using a forward integer transform algorithm, wherein the transform algorithm is configured to provide the set of integer binary spectral representation values representing frequencies in an ascending order, and wherein the set bits of the spectral representation value are bits whose valency is less than or equal to a signal limit valency, the method having the steps of: converting the second sequence of samples using the forward integer transform algorithm to obtain an extraction set of integer binary spectral representation values representing frequencies in an ascending order; providing information on signal limit valencies associated with the spectral representation values; and extracting only the bits of the spectral representation values whose valencies are less than or equal to the signal limit valencies associated with the spectral representation values, wherein the extracted bits represent the binary payload.

In accordance with a fifth aspect, the present invention provides a computer program with a program code for performing one of the above-mentioned methods.

The present invention is based on the finding that a time-discrete signal, hereinafter also referred to as carrier signal, may be favorably processed to obtain information if the signal is transformed to a spectral representation by means of an integer transform algorithm, wherein the spectral representation includes integer binary spectral representation values. For this, any integer transform algorithm may be employed, such as an integer wavelet transform or an integer MDCT, which is also known as IntMDCT (integer modified discrete cosine transform) in the art. An integer transform suitable for the present invention provides integer binary spectral representation values from binary discrete values which may be transformed back to the time domain using the corresponding back transform algorithm so that the result will be again integer binary time-discrete values.

The forward integer transform and the back integer transform thus have the property that they operate losslessly, i.e. without rounding errors. The present invention relies on this property in that the information to be inserted into the carrier signal is inserted in the spectral domain by using low-value bits of the spectral representation values to insert the information, i.e. to be set and/or not to be set according to the information.

For this, the invention provides means for determining a signal limit valency for a spectral representation value which reproducibly sets a signal limit valency (for an information extractor). For the carrier signal not to be "distorted" too much by the information to be inserted, the spectral limit valency for a spectral representation value is at least one valency level below the valency of the leading bit of the considered spectral representation value with respect to the binary representation. Preferably, the distance of the signal limit valency from the valency of the leading bit of a spectral representation value is determined such that, when the carrier signal is an audio signal, the spurious energy introduced by the inserted information is below the psychoacoustic masking threshold. For other spectral representation values in the set of integer binary spectral representation values, the signal limit valency may well lie above the leading bit, when the spectral representation value is "masked away" anyway due to psychoacoustic effects such as pre-masking or post-masking etc.

Depending on the embodiment, a more or less complex model is used for determining the signal limit valency, wherein the simplest model in which there still have to be made compromises with respect to the data rate simply consists in that the signal limit valency is always a predetermined number of valency levels below the valency of the leading bit of the considered spectral representation value. Although this approach has the disadvantage of a lower data rate, it has the advantage that the signal limit valency in embedding the payload in the carrier signal can be determined and that also a payload extractor may determine the signal limit valency without transmission of side information and/or without further calculations for each spectral representation value.

More advanced measures for determining the signal limit valency consist in calculating the psychoacoustic masking threshold either based on the carrier signal itself or based on the transformed carrier signal, i.e. the set of integer binary spectral representation values reflecting a sequence of values of the carrier signal. In this case, a corresponding calculation is performed in the extractor to determine again—without transmission of side information—the signal limit valency for the spectral representation values in which information is inserted.

According to the invention, a certain number of bits is thus determined for each spectral representation value which may be used for inserting information. The inserting of information is performed by using a bit stream representing payload to set and/or not to set corresponding bits of the spectral representation values whose valencies (significances) are less than or equal to the signal limit valency. After the spectral representation values of a set of integer spectral representation values have been "enriched" with payload, an inverse integer transform algorithm is used to generate again a sequence of time-discrete values. The backward integer transform algorithm is adjusted to the forward integer transform algorithm such that the back transform is again performed losslessly, i.e. without rounding errors. For reasons of efficiency and particularly due to its especial suitability, the IntMDCT is preferred as it has the property to handle a forward and a backward transform without rounding errors.

The present invention is advantageous in that it allows embedding payload in a time-discrete carrier signal with a high data rate. Therefore, when the present invention is applied to audio CDs or, for example, is applied to CD-compatible audio data transmitted via the internet, it may be used to impress any payload on the audio data without them being audible for a listener, such as a compressed version of the audio signal itself or additional data in the form of, for example, JPEG-compressed image data which, for example, represent a picture of the performer etc. Of course, also the song text, for example, or any other additional information may be impressed on the carrier signal according to the invention.

A further advantage of the inventive concept is also that the format of the carrier signal, i.e., for example, a CD-compatible format for audio data, is not affected by the inventive embedding of information. Thus both the original carrier signal prior to the embedding of information and the carrier signal with embedded information output by the embedder are compatible for a replay device, for example a CD player or a DVD player.

A further advantage of the present invention is that effort and payload rate are scalable with each other in that the data rate by more sophisticated measures for calculating the masking threshold may be used where higher data is required, while simple measures for determining the signal limit valency of a spectral data value may, in turn, be used where the data rate is not decisive, but where rather the cost of the end product in the form of a decoder with integrated payload extractor is decisive.

At this point, it is to be noted that decoders are products of the coding/decoding system which are output in high numbers and thus have to be low in price to compete on the market. What is more, normally the aim is even to distribute the decoders for free or only for a symbolic price so that a new coding/decoding standard will prevail and that then the costs for the development of the decoder are rather intended to be carried by the correspondingly encoded data, i.e. music, video etc. Particularly in such a scenario, it is decisive that the decoders, at least in a "slimmed-down" version (with medium-high data rate), may be equipped with an algorithm with little requirements regarding computing time and storage for determining the signal limit valency to be able to produce decoders at a very low price.

The inventive concept is thus advantageous in that it is also version-compatible such that, for example, a base version with not too high data rate may even be distributed for free and that then, for achieving a higher data rate, upgrades may be supplied in which the signal limit valency is calculated with more effort to allow a higher data rate, wherein, for such upgrades, then a price may be asked that the customer is prepared to pay because he or she has already come to know the advantages of the "base version".

A further advantage of the present invention is that existing modules may be used, e.g. for calculating the psychoacoustic masking threshold or for the forward and back transform, and that the new modules such as the means for determining the signal limit valency or the means for setting the bits are implementable very easily according to the payload such that also the development and testing effort will remain limited due to the inventive concept.

BRIEF DESCRIPTION OF THE DRAWINGS

Preferred embodiments of the present invention will be explained in more detail in the following with respect to the accompanying drawings, in which:

FIG. 3 is a schematic illustration of several spectral representation values in the order of valency for illustrating the determination of the signal limit valency in a first embodiment of the present invention;

FIG. 4 is a diagram as in FIG. 3, but for illustrating an additional measure for increasing the data rate by inserting a listening threshold;

FIG. 7b is a block circuit diagram of a known decoder for decoding the values generated by FIG. 7a;

DESCRIPTION OF PREFERRED EMBODIMENTS

Figure 1:
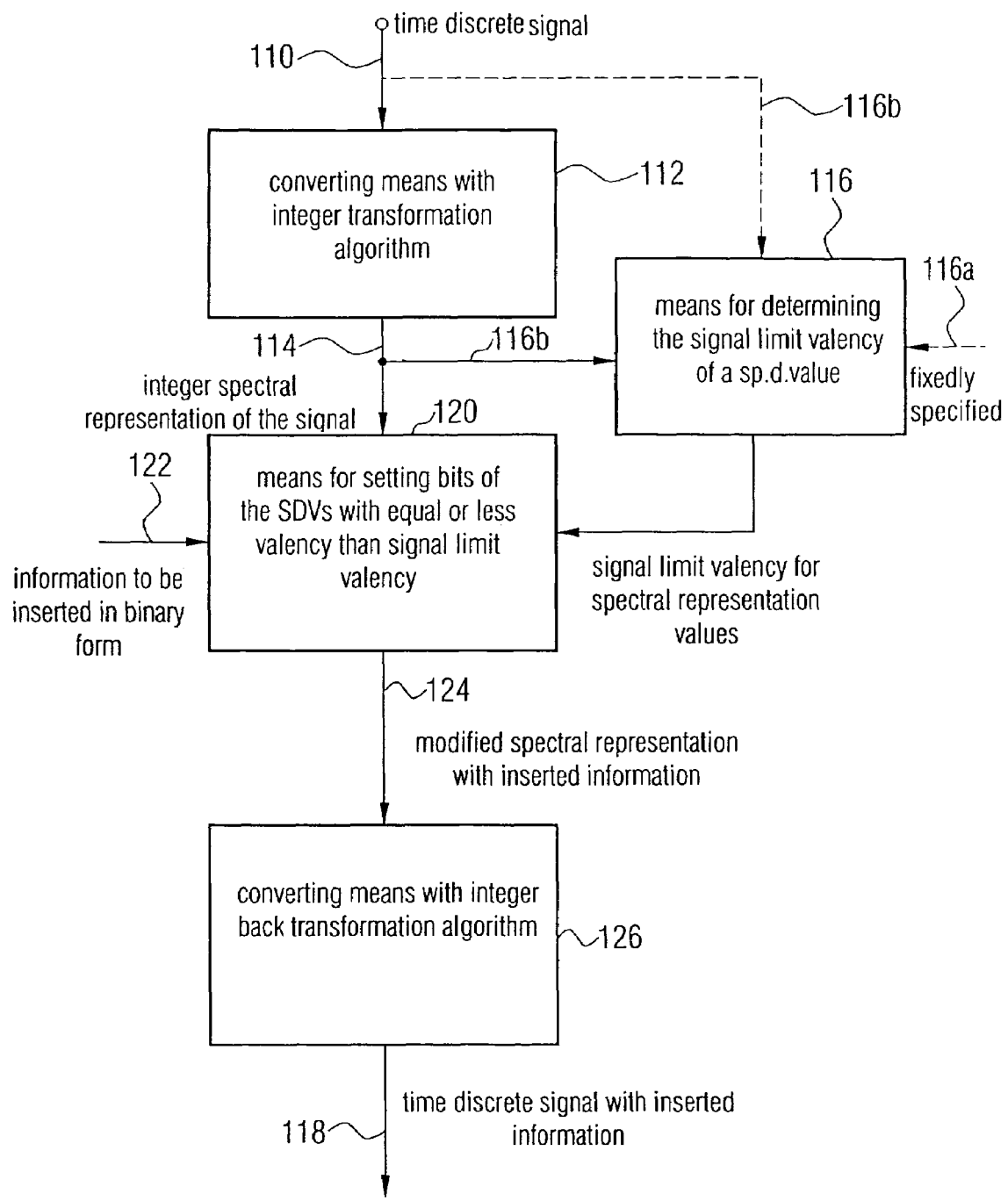
FIG. 1 is a block circuit diagram of an inventive device for embedding payload into a carrier signal.

FIG. 1 shows an inventive device for embedding binary payload in a carrier signal comprising a first sequence of binary discrete values. The time-discrete carrier signal is supplied to the device shown in FIG. 1 via an input 110. Means 112 for converting is preferably designed to group the time-discrete signal by corresponding windowing preferably in 50% overlap in sequences with a certain number of values and to convert it to a spectral representation. The means 112 is designed to use a forward integer transform algorithm which is preferably the IntMDCT algorithm. Due to the forward integer transform algorithm, a set of integer binary spectral representation values is provided at an output 114 of the converting means 112. The converting means 112 thus provides spectral representation values. A spectral representation value is designed in binary form and includes bits, wherein each bit of the spectral representation value is associated with another binary valency. Binary valencies are, for example, $2^0, 2^1, 2^2, 2^3, 2^4, \ldots, 2^i, \ldots, 2^n$. The bit with the valencies $2^0$ is referred to as least significant bit (LSB), while the bit with the valency $2^n$ is referred to as most significant bit (MSB). Furthermore, not every spectral representation value will be so large that the MSB is set in it. In that respect, each spectral representation value includes a set bit with a highest valency in the bits of the spectral representation value. This bit, which, for example, is the bit with the valency $2^i$, is referred to as leading bit of the spectral representation value and has a higher valency than all other meaningful bits of the spectral representation value as they have a lower valency which ranges from the valency i-1 to the valency 0, i.e. the LSB.

The inventive device further includes means 116 for determining a signal limit valency of a spectral representation value. Depending on the form of implementation, the signal limit valency of a spectral representation value may be determined in different ways. For the information content of the carrier signal not to be distorted too much or at all by the binary payload to be inserted, the signal limit valency will be one valency level below the valency of the leading bit of the spectral representation value, at least for a spectral representation value in the group of spectral representation values. Depending on the sort of carrier signal, it may, however, occur that, for other spectral representation values, the signal limit valency will be equal to the valency of the leading bit or even above the valency of the leading bit of a further spectral representation value as set forth in the following. The simplest way for determining the signal limit valency consists in the means 116 operating on the basis of a pre-specified distance to the valency of the leading bit of the considered spectral representation value, as illustrated by a control input 116a via which this pre-specified distance may be provided to the means 116.

If the carrier signal is an audio signal, a mere pre-specified valency difference of 3 should be enough for the payload inserted in the carrier signal to be inaudible so that the modified time-discrete signals with inserted information obtained at an output 118 of the embedding device is psychoacoustically transparent, i.e. the modified signal can hardly or not at all be distinguished from the original signal, which was input via the input, by a human listener. A valency distance of the spectral representation values of 3 means that the energy of the payload inserted into the carrier signal will be lower by 18 dB for each spectral representation value than the energy of the carrier signal itself in the frequency band described by the spectral representation value.

Alternatively or additionally, the means for determining the signal limit valency of a spectral representation value may be designed to calculate the psychoacoustic masking threshold for each spectral representation value or at least for a group of spectral representation values preferably describing a critical band, either based on the time-discrete signal in the time domain (line 116b) or based on the time-discrete signal in the frequency domain (116b). The signal limit valency of the spectral representation value is equated with the psychoacoustic masking threshold, if the psychoacoustic masking threshold has been determined per spectral representation value. If, however, the psychoacoustic marking threshold has only been determined for a band with several spectral representation values, the signal limit valency is determined for the spectral representation values together such that the entire "spurious energy" inserted into this band is less or equal to the psychoacoustic marking threshold due to the information inserted in the carrier signal.

Considering video signals, the psychooptical masking threshold is used instead of the psychoacoustic masking threshold, which may be specified analogously in the spatial frequency domain. In particular, the psychooptical masking threshold may be specified for each color plane, when the video signal includes, for example, spectral coefficients for three base color planes.

If the carrier signal is another redundant information signal which is convertible from a time domain to a spectral domain, a corresponding other model may be used to determine signal limit valencies for spectral representation values so that the binary payload inserted in the carrier signal lead to hardly any or no discernable information loss of the modified carrier signal.

Both the set of integer binary spectral representation values at output 114 of the converting means and the signal limit valency information output by the means 116 are provided to means 120 designed to set bits of the spectral representation values with equal or less valency than the determined signal limit valency according to the binary information to be inserted which is provided to the means 120 via a payload input 122. The means 120 is designed to load consecutive spectral representation values in the set of integer binary spectral representation values with payload according to a predetermined pattern, wherein the "loading" algorithm is preferably pre-specified, so that it does not have to be explicitly communicated to an extractor, for example via side information or via an extra signaling channel. Preferably, care is taken that the signal limit valencies and the "loading" algorithm are designed such that no signaling information becomes necessary so that the time-discrete signal with the inserted information at the output of the device shown in FIG. 1 has the same compatibility properties as the original time-discrete signal supplied at input 110 such that the time-discrete signal with inserted information at output 118, if it is an audio signal, is suitable, for example, for a CD player just like the original time-discrete signal and may thus be replayed by the same easily independent of whether the CD player extracts the embedded payload or not.

The set spectral representation values applied to an output 124 of the means 120 for setting bits are now back-transformed again to the time domain by means of a further converting means 126, wherein the converting means 126 is designed to perform an integer back transform algorithm which generates integer (modified) time-discrete values from integer modified spectral representation values. The back transform algorithm performed by the means 126 is adapted to the forward integer transform algorithm performed by the means 112 such that no rounding losses occur by the combination of forward transform and backward transform, which would otherwise lead to a loss of information as rounding up or rounding down would lead to a change of low bits in which, however, most information has been inserted according to the invention.

At the output of the converting means 126, there is thus again a sequence of binary discrete values together representing a temporal portion of the now modified carrier signal. Lining up the blocks generated one after the other due to the block processing of the inventive device results again in the modified carrier signal still compatible for an originally intended player device, from which now the binary payload may again be extracted by an extractor described in the following with respect to FIG. 2.

Figure 2:
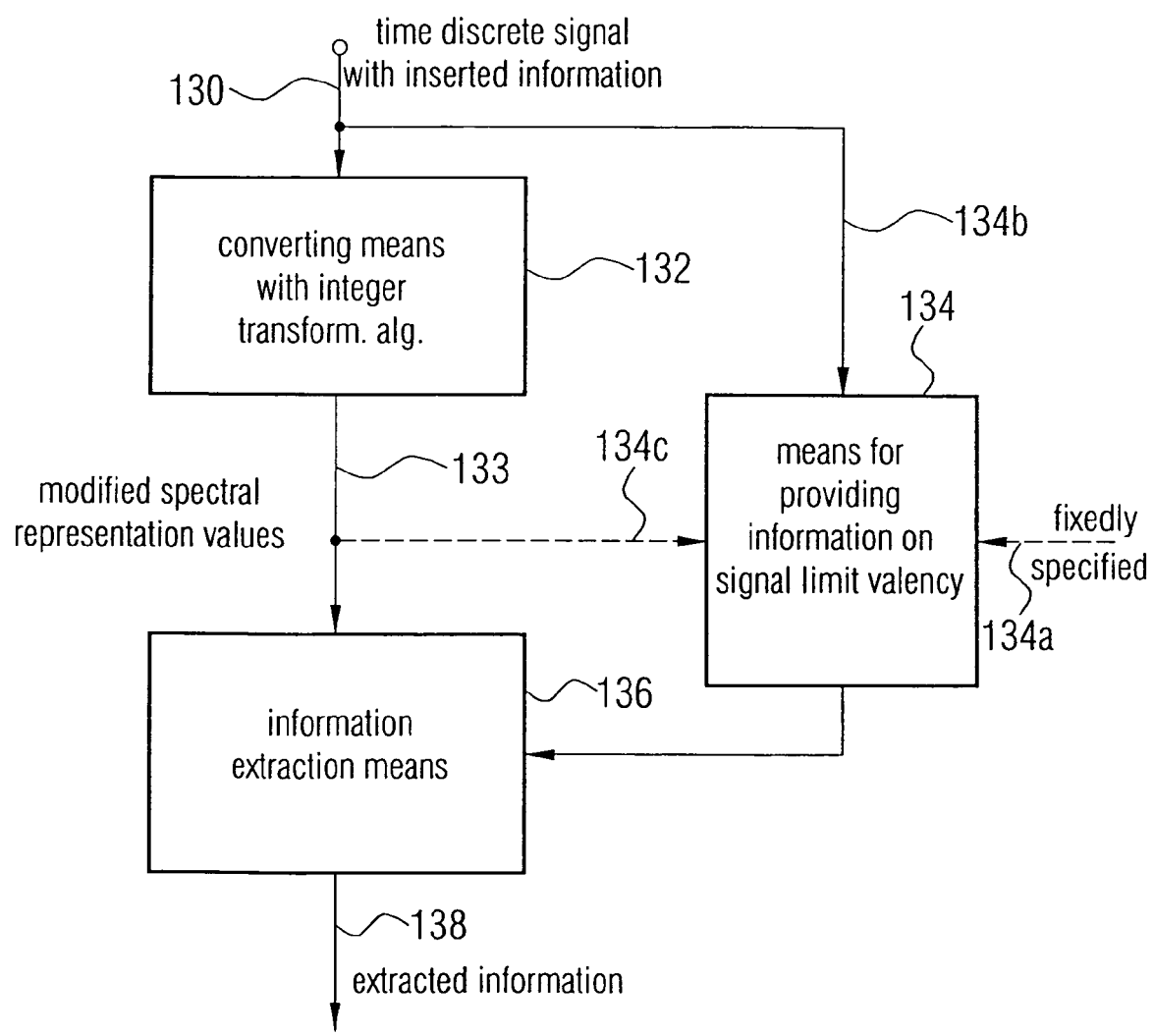
FIG. 2 is a block circuit diagram of an inventive device for extracting the payload from a modified carrier signal.

FIG. 2 shows an inventive extractor with an input 130 for a time-discrete signal with inserted information. The device shown in FIG. 2 is particularly designed to extract payload from a modified carrier signal comprising a second sequence of samples in which the binary payload is embedded, wherein the payload is inserted by setting bits of a spectral data value which is a spectral representation value from a set of integer binary spectral representation values, wherein the spectral representation value comprises bits, wherein another valency is associated with each bit of the spectral representation value, wherein a set bit with a highest valency in the bits of the spectral representation value is a leading bit of the spectral representation value and all remaining bits of the spectral representation value have a lower valency than the leading bit.

In particular, the set of integer spectral representation values was generated by converting a first sequence of discrete values to a spectral representation using a forward integer transform algorithm designed to provide a set of integer binary spectral representation values derived from the first sequence of discrete values. The set bits of the spectral representation values are bits whose valencies are less or equal to a signal limit valency for the spectral representation value.

More specifically, the extractor in FIG. 2 includes means 132 for converting the second sequence of samples to a spectral representation using a forward integer transform algorithm to obtain an extraction set of integral binary spectral representation values. The inventive extractor further includes means 134 for providing information on the signal limit valency of a spectral representation value of the group of spectral representation values at the output of the converting means 132. The means 134 is further designed to provide the information on the signal limit valency in one or more different ways. One way consists in using a pre-specified signal limit valency as indicated by an input 134a. Alternatively, the signal limit valency for a spectral representation value may also be determined on the basis of the data provided via the input 130, as indicated by an input 134b. Alternatively, the means 134 may also be designed to operate using the modified spectral representation values, as indicated by an input 134*c*. The means 134 then provides the information on signal limit valencies for spectral representation values to an information extraction means 136 which is, for example, designed to discard all bits of a spectral representation value above the signal limit valency and to lign up the remaining bits from one spectral representation value to the next spectral representation value in order to obtain again a stream of extracted payload at an output 138.

According to the invention, the embedding of the additional data is thus performed in the frequency domain to preferably allow an inaudible modification of the carrier signal which is, for example, an audio signal due to psychoacoustic masking effects. A perfectly reconstructing integer transform such as the IntMDCT is preferably used for the representation of the audio signal in the frequency domain. This allows an invertible representation of the integer audio samples as integer spectral values. This has the advantage that, also after the modification of the integer spectrum by the payload to be inserted, there are again integer samples in the backward transform to the time domain. An additional lossless rounding to integer samples is not required and not desired according to the invention, as this could lead to a loss of information. Thus the modified integer spectrum may be exactly reconstructed also after the back transform to the (quantized) time domain.

As the simplest variant for the embedding concept, i.e. for the functionality of means 116 of FIG. 1 and the means 120 of FIG. 1, a constant block length of the converting means 112 preferably performing the IntMDCT is assumed. For example, a block length of 256 spectral lines is provided. The set of integer binary spectral representation values thus includes 256 spectral lines. This represents a compromise between a good frequency resolution for tonal signals and a good time resolution for transient signals.

Furthermore, as mentioned above, the pre-specified variant of the means 116 for determining the signal limit valency is used. Thus for every spectral line, i.e. for every spectral representation value, a fixed signal noise ratio is set which is sufficient to maintain a transparent audio quality. An absolute value of a spectral representation value in the binary representation is considered. Due to the psychoacoustic masking effects, a certain number of bits below the highest bit unequal 0, i.e. the leading bit, is further assumed to be required for a transparent audio quality. Three bits are necessary, for example, for a signal noise ratio of 18 dB. This means that, in this concept, both the leading bit and the two bits with valencies directly below are not available for payload embedding. But all bits with a valency of at least 3 less than the valency of the leading bit may be used for embedding the payload without reservations with regard to a finally resulting distortion. If, for example, a spectral line has the leading bit at position 8, five bits may be used for embedding the additional data in this example. This is illustrated for two different variants in the following with respect to FIGS. 3 and 4.

FIG. 3 shows a diagram of five obtained spectral representation values 140-148 representing frequencies in ascending order, as indicated by frequency arrow 150 in FIG. 3. In FIG. 3, each spectral representation value is assumed to be an 8 bit number. The valency of the leading bit of the spectral representation value 140 is 6. The valency of the leading bit of the spectral representation value 142 is 3. However, the valency of the leading bit of the spectral representation value 144 is 7, while the valency of the spectral representation value 146 is 5 and the valency of the spectral representation value 148 is 2.

In FIG. 3, there is further illustrated the pre-specified signal limit valency mode such that the signal limit valency has a distance of three valency levels to the leading bit of the corresponding spectral representation value. The signal limit valency for the spectral representation value 140 is 3, while the spectral limit valency for the spectral representation value 140 is 0. However, the signal limit valency for the spectral representation value 144 is 4. The spectral representation value 146 has a signal limit valency of 2, while the spectral representation value 148 does not have any signal limit valency, because this value has a leading bit with a valency of only 2 which means that no payload may be embedded into the spectral representation value 148 so that the transparency of the signal is not negatively affected. The information supplied to the extractor via the input 134*a* and/or the embedder via the input 116*a* is of 3 valency levels, as indicated by double arrow 152 in FIG. 3.

The means 120 for setting of FIG. 1 is thus operative to set all bits equal to the signal limit valency of the group of spectral representation values and all bits with a lower valency than the signal limit valency according to the payload in the embodiment shown in FIG. 3. The sequence of payload set in FIG. 3 would thus be 1001, 1, 10100, 001. A decoder for the payload would then interpret these bits, for example, as bits of a data stream which, in connection with several blocks of spectral representation values, together represents an audio signal, a video signal, a text or the like.

It is to be noted that this simple variant of the inventive concept described in FIG. 3 is based on a signal-independent psychoacoustic model requiring, for example, a distance 152 of three valency levels and/or three bits for each spectral line.

In a preferred embodiment of the present invention, however, a signal-adapted psychoacoustic model is used. It is to be noted here that the number of psychoacoustically significant bits for each spectral line, also after the modification of the non-significant bits by the signal embedding, may also be calculated by an extractor so that no parallel side information has to be communicated. This may, for example, be achieved by only using the leading bits of each spectral value for the calculation of the psychoacoustic model and by not changing at least the leading bits in the embedding although this would be possible due to the psychoacoustic model. Thus, for smaller, strongly masked spectral values, more bits may be used for embedding the additional data, as will be shown below with respect to FIG. 4.

It is to be noted that the use of only the leading bits of a spectral representation value for calculating the psychoacoustic masking threshold means that each spectral representation value on which the psychoacoustic masking threshold is based is a rounded version of the actual spectral representation value. However, since psychoacoustic masking effects increase with increasing power in a spectral representation value, i.e. with increasing amplitude of a spectral representation value, the use of rounded spectral representation values is advantageous in that, although a smaller amount of embedded payload may be provided for some spectral representation values, the psychoacoustic transparency is ensured in any case. More specifically, this means that the masking threshold calculated due to a group of rounded spectral representation values is in any case lower than the masking threshold the non-rounded spectrum would have.

A comparison of FIG. 3 and FIG. 4 shows that, in the selected example, the spectral representation value 142 is completely masked away by the two adjacent large spectral representation values 140 and 144 and that at least the bit with the valency 3 of the spectral representation value 146 does not contribute to the psychoacoustic overall impression either and is thus also masked away. The same applies to the lowest three bits of the spectral representation value 148. The payload embedded in the spectrum shown in FIG. 4 would therefore represent the following payload sequence: 1001, 1001, 10100, 1001, 110.

A comparison of FIG. 4 and FIG. 3 further illustrates that only 13 information bits may be embedded by the simple pre-specified version of the means 116 for determining the signal limit valency of a spectral value in the example spectrum, whereas in the case where the means 116 operates on the basis of a psychoacoustic model, as much as 20 information bits may be inserted. This shows the scalability advantage of the inventive concept in that, by additional effort in the embedding (and thus also in the extraction), the data rate may be significantly increased.

It further is to be noted that, in the example shown in FIG. 4, the signal limit valency of only the spectral representation values 140 and 144 is below the valency of the respective leading bit by the distance 152. However, in the case of the spectral representation value 142, the signal limit valency coincides with the valency of the leading bit of this spectral value, which, in turn, means that this spectral representation value is completely masked away. In the case of the spectral representation value 146, the signal limit valency is 3 and thus only two valency levels below the valency of the leading bit, which is 5 in the case of the spectral representation value 146. Finally, the signal limit valency in the case of the spectral representation value 148 is also equal to the valency of the leading bit, i.e. equal to the valency 2.

For very quiet audio signal passages, a threshold in quiet and thus a quiet limit valency may further be designed which is independent of the leading bit of such a spectral representation value in that, for example, it is laid down that, independent of the valency of the leading bit of a spectral representation value, the quiet limit valency is, for example, always equal to the valency 3. In the example shown in FIG. 4, this would mean that the bit with the valency 3 of the spectral representation value 148 could also be used to insert information. Thus, the quiet limit valency of a spectral representation value in a group of spectral representation values may also be higher than the valency of the leading bit of this spectral data value after the conversion by the means 112 of FIG. 1. For preventing a very low data rate for additional data in the case of quiet passages of the audio signal, and also to allow a certain minimum data rate, the fixed threshold in quiet is thus preferably assumed to define a limit valency up to which information may be inserted in any case. It is further preferred to design this fixed threshold in quiet with regard to frequency such that it assumes different values for different frequencies represented by the different spectral representation values. The threshold in quiet may, for example, be at lower valencies for lower frequencies than for higher frequencies, which may be very important particularly for spectral representation values of very high frequencies as such high frequencies can only be discerned by very few listeners anyway. Regarding the frequency-dependent curve of the threshold in quiet, however, see the relevant basic psychoacoustic literature.

As has been discussed, the signal supplied to the embedder in FIG. 1 is a stream of discrete values. The converting means 112 generates consecutive sequences of samples from the stream of supplied values, which are converted to a spectral representation by the forward integer transform algorithm. Preferably, as discussed, the integer MDCT is used which operates using overlapping and addition which are also known as overlap and add in the art. An overlap of 50% is preferably used so that successively processed sequences of samples each have a 50% overlap so that, when a block length is, for example, 2048 samples, the first block reaches from sample 1 to sample 2048, while the second block reaches from sample 1024 to sample 3072, etc. Thus it can be said that per "addition" of new 1024 samples, a set of integer binary spectral representation values with 1024 integer binary spectral representation values is generated, as explained in more detail below with respect to the FIGS. 7a, 7b, 8, 9 and 10. The back transform of the modified spectral representation values using the means 126 finally provides again a stream of time-discrete values which, if no additional synchronization information is embedded which should be avoided for compatibility reasons, do not show which block division was originally used to perform the short-term transform.

An extractor as shown in FIG. 2 must therefore, if there is no synchronization information, first find out the block division originally performed by the information embedder. Beside the fact that the same transform and the same psychoacoustic model have to be applied for the extraction of the payload from the audio signal as for the embedding to obtain the same binary representation and the same division of this binary representation into psychoacoustically significant and non-significant bits representing the embedded additional data, also the time offset with which the transform has been applied block by block to the original audio signal prior to the embedding will be known in an embodiment in which the signal embedded in the extractor does not have any synchronization information. Such a problem also occurs when the audio signal was shortened, for example, or the extraction of the additional data was begun at an arbitrary place in the signal. Therefore, the extraction device shown in FIG. 2 further includes means for determining the block raster applied in the embedding which is upstream to the input 130 of the device shown in FIG. 2. According to the invention, it is preferred to insert a little redundancy, such as a checksum, in the payload embedding which allows to distinguish the extracted data with correct block raster from extracted data with incorrect block raster with a certain certainty.

If, for example, a block length of 256 time-discrete values was used, wherein this information should be known or is also iteratively determined, it is preferred to perform a payload extraction starting from a certain value in the time-discrete signal with inserted information. If, for example, there is a block length of 256 samples and the supposed payload of 10×256 blocks is extracted with an offset of one sample for finding the block offset, the correct checksum should occur 10 times with a spacing of 256 samples. This means that the payload embedder embeds the same binary number and/or different binary numbers with a predetermined relation to each other, for example always twice as large or always half as large or always lower by 1, etc., in each block of spectral representation values generated in the embedding. This binary number may depend on the inserted data (for example as checksum or hash, etc.) or not (synchronization word, etc.).

In particular, the procedure is such that, starting from a determined value in the time-discrete signal with the inserted information, for example 10 consecutive blocks are processed and the checksums are considered. If identical checksums are expected per block and if the obtained checksums vary, this is a sign that the block raster has not been encountered by chance. In this case, the whole procedure is repeated, but this time not with the sample used before as starting point, but with a sample as starting point which has an ordinal number larger by one that the sample used before. The checksums obtained for this new test block raster are again considered. If, again, they are not identical, the same procedure is repeated once more, but this time starting from a sample which had an ordinal number larger by two than the original sample. This procedure is repeated until the checksums processed over the number N of consecutive blocks, wherein N is, for example, 10, have the predetermined relation to each other, e.g. are equal. In the extreme case, this procedure has to be repeated 255 times, if the worst case is assumed, i.e. the original value where the whole checking procedure was started was higher by just one ordinal number than the actual block raster.

Thus individual blocks with an incorrect offset could by chance provide the correct checksum. But it is particularly unlikely that such an "unwanted hit" occurs N times in a row such that an alleged periodic block structure could be pretended. The certainty grows as N is increased. Thus a very low redundancy in the payload is enough for finding the block structure in that the checksum only has to be determined very roughly.

A further possibility for finding the block structure is inserting a "pilot tone". This means that one or more spectral lines get a fixed value below the hearing threshold. For example, the bands with the highest frequencies could be used for this. The correct values then only appear in the decoder when the correct block raster has been found. For this procedure, always the pilot tone spectral representation value is examined instead of the checksum. This procedure also has to-be performed 255 times in the worst case, if a block originally had 256 samples. When the block structure has been found, all other blocks may be transformed with the known block structure and the additional data may be extracted.

As is known in the art, a fixed transform length is a compromise between good frequency resolution for tonal signals and good time resolution for transient signals. Switching the block length as it is common in hearing-adapted audio coding allows better adaptation of the error added by the additional data to the audio signal. If the payload embedder is designed to employ signal-adapted block switching algorithms, the extractor can only work properly if this information is communicated to it, for example as side information, or if it is designed to find out the actually used block structure, for example by the redundancy inserted in the payload. For this, the extractor will apply the transform with all transform lengths and window forms possible in the current block in an embodiment of the invention. The extractor must then decide based on the checksums which are, for example, inserted, with which variant of the transform, i.e. with which block length and window form, the embedding was performed.

In the following, a preferred field of application for the inventive concept will be discussed with respect to FIG. 5. The general field of application is the audio CD and/or the generation of CD player-compatible audio data, also referred to as PCM sample audio data. According to the invention, additional data with a high data rate may be inserted into the audio data without audible changes and without compatibility problems. The described finding of the block structure in the embedding also allows a synchronization of the extraction of the additional data when replaying any part of an audio track, for example after actuating fast forward or a random play mode of a CD player.

Furthermore, an audio CD contains error protection mechanisms which may correct certain errors when reading out the raw data and thus may exactly reconstruct the original audio samples. As long as this error correction is successful, there is also performed an "automatic" correction of the payload inserted in the audio data so that the payload may be again extracted from the corrected audio samples. If, however, an error correction is no longer possible, error disguising mechanisms are applied in certain CD players which reduce the audible errors, but no longer reconstruct the audio samples exactly. Thus, of course, also the payload is no longer exactly extractable. Thus, if such errors occur, the additional data can no longer be extracted free of errors either. In order to still allow a reliable transmission of the additional data, it is preferred in this case to encode the additional data with an error protection method adapted to the kind of expected error prior to their embedding into the audio data. For this, any forward error correction methods known in the art may be employed which allow a payload extraction with a maximum adjustable bit error rate in cooperation with, for example, a Viterbi decoder in the watermark extractor, even if the signal/noise ratio have occurred due to errors in the transmission channel such as the CD or a line-bound channel.

In preferred embodiments, it is preferred to transmit the following additional data to audio CDs. A variant of the additional data and/or payload are video data. With modern video encoding methods, such as MPEG-4 video, video data may be compressed in good quality to such an extent that they may be embedded in the uncompressed audio signal, i.e. the sequence of PCM samples, with the inventive embedding concept.

Furthermore, audio data may be embedded in the audio carrier signal. Modern audio encoding methods, such as MP3 or AAC, allow a high audio quality with data rates of 128 kbit/s and less. Thus, compressed audio data may be embedded into the uncompressed audio data with the inventive concept. It is, for example, preferred to put the compressed audio data necessary for, for example, portable player devices, directly on the audio CD as well. Thus audio CD players may be realized which can transmit the audio data to portable player devices without having to compress them themselves with high computational effort. The compressed variant of the audio signals may be inserted into the audio data as soon as in the mastering process of the audio CD. The complexity of the extraction process is significantly less than that of a complete encoding process for generating the compressed audio data themselves.

The above system will be illustrated below with respect to FIGS. 5 and 6. For example, FIG. 5 shows an embedder 160 as illustrated in FIG. 1. On the one hand, the embedder receives the CD PCM samples via its input 110 and the information to be inserted in binary form via its input 122. Further, an audio compressor 162 is shown in FIG. 5 which generates the information to be inserted, representing a compressed version of the original CD PCM samples, from the CD PCM samples at the input 110 of the embedder 160. On the output side, i.e. at its output 118, the embedder provides an audio signal which contains a compressed version of itself, psychoacoustically transparently embedded. This information is then supplied to a CD writer 164 which, at the same time, receives a blank CD 166 in order to burn the audio signal applied to the input 118 containing a compressed version of itself embedded in itself to a CD obtained at an output 168 of the CD writer.

Figure 5:
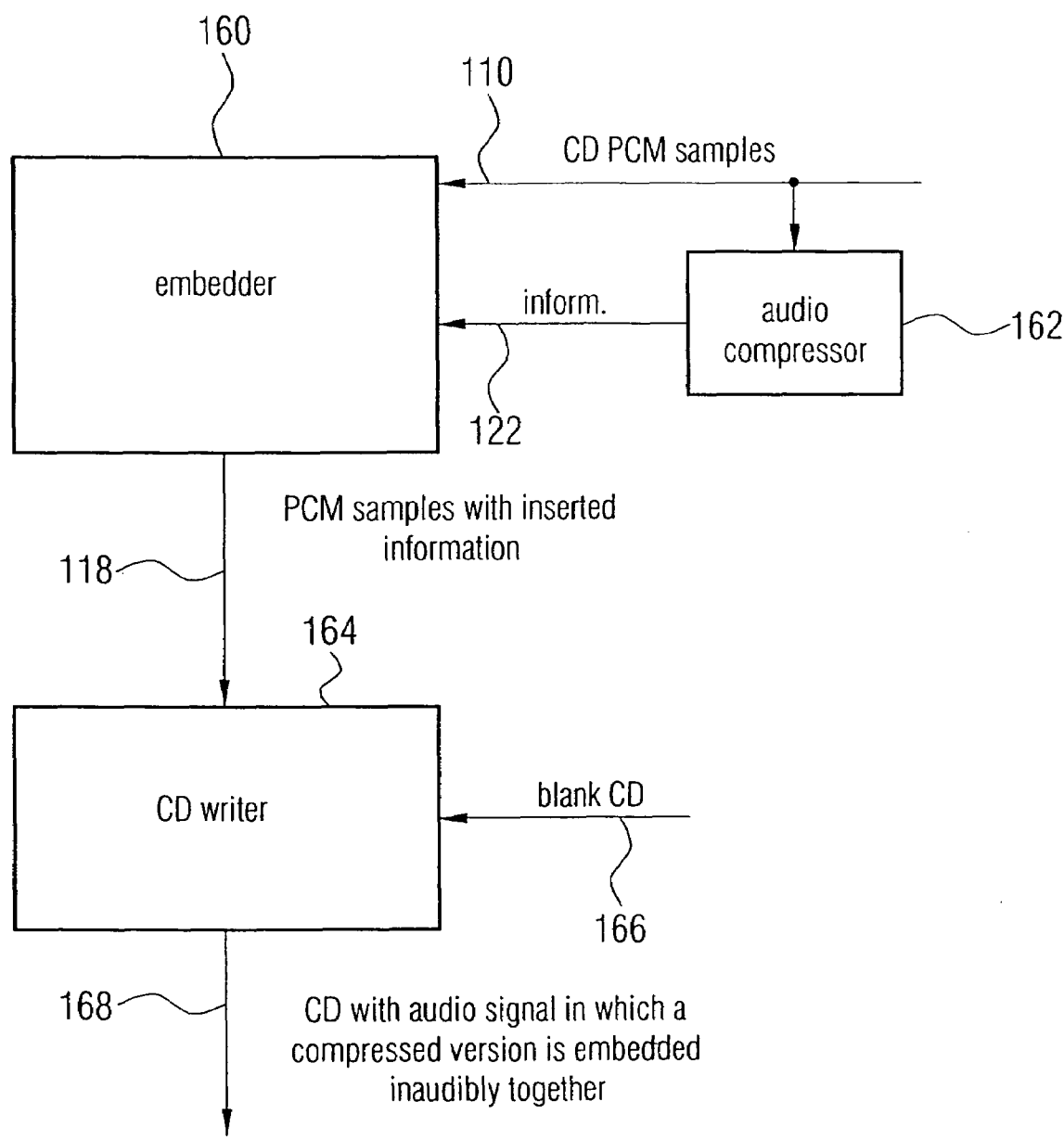
FIG. 5 is an application scenario for the inventive concept in the example of an audio signal as carrier signal.
Figure 6:
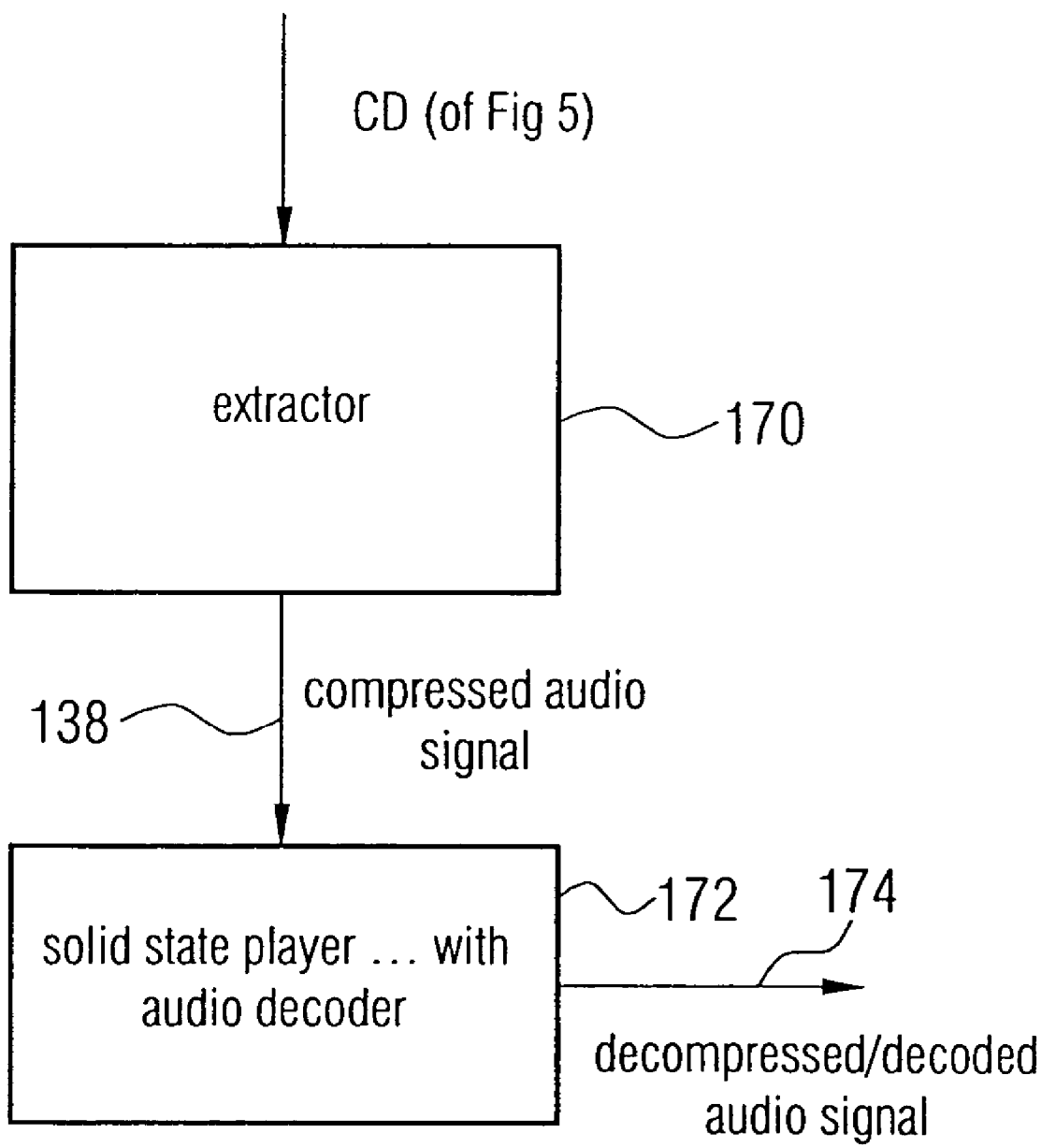
FIG. 6 is an application scenario for an inventive extractor based on the example of an audio signal as carrier signal.

The CD generated by the procedure in FIG. 5 is put into an extractor 170 which, for example, may be part of a CD player or may be implemented in a multi-purpose computer. The extractor 170 in FIG. 6 is implemented as illustrated in FIG. 2. The extractor 170 is not so much interested in the uncompressed audio data, but extracts, from the CD and/or the CD-compatible data stream, only the compressed audio signal at is output 138 which here occurs as binary data stream. According to the invention, it is preferred to load this data stream representing the compressed audio signal into a portable player with limited storage capacity, such as solid state player 172. The solid state player 172 includes an audio decoder for decoding and/or decompressing the compressed audio signal applied to the output 138 which may then be reproduced by the player 172, as indicated by an output 174 in FIG. 6. What is advantageous in this concept is that the extractor 170 may be designed significantly less complex than a complete audio encoder, which particularly implies the advantage that such a device may be offered at a significantly lower price than a complete audio encoder, for example in a scenario in which a buyer purchases a CD and would also like to play this CD on his or her solid state player. He/she would have to completely encode the signal on the CD and/or the data stream which, for example, is available over the internet, at home to load the signal onto his/her solid state player. According to the invention, only an extraction of the compressed version of the audio signal from the CD has to be performed with significantly less effort than a complete encoding, wherein this effort may readily be translated into a lower price.

In the following, the IntMDCT transform algorithm, which is described in "Audio Coding Based on Integer Transforms" 111th AES Convention, New York, 2001, will be discussed as an example for an integer transform algorithm. The IntMDCT is particularly advantageous as it has the attractive properties of the MDCT, such as a good spectral representation of the audio signal, critical sampling and block overlap.

Figure 7A:
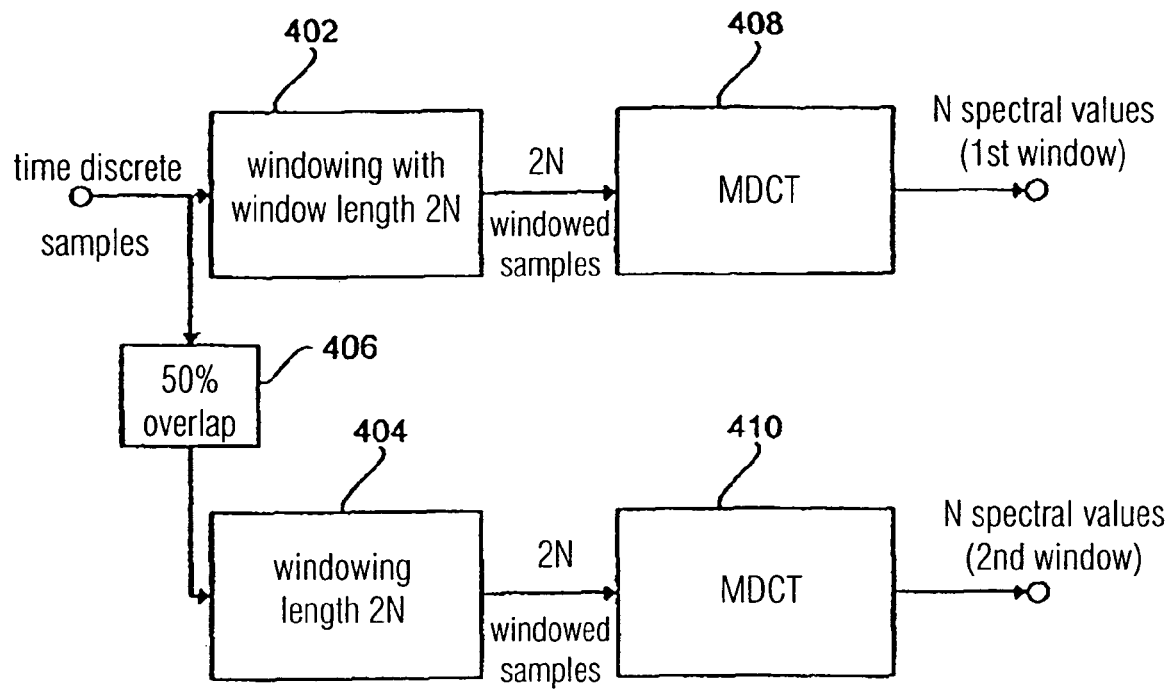
FIG. 7a is a schematic block circuit diagram of a known encoder with MDCT and 50 percent overlap.
Figure 7B:
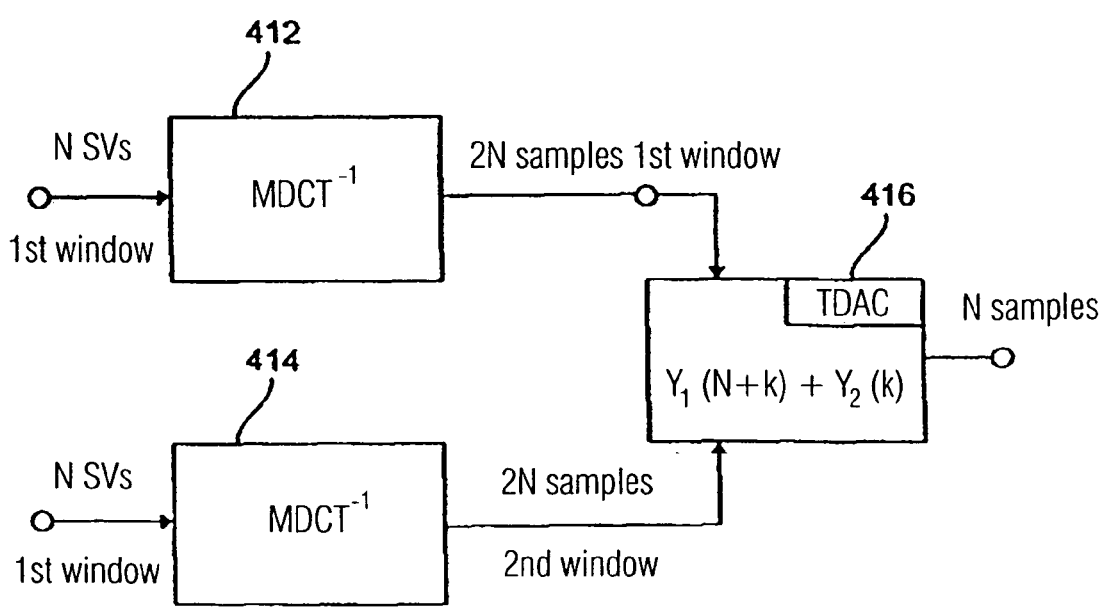

Before discussing the preferred IntMDCT in more detail, a conventional MDCT is illustrated with respect to FIGS. 7a and 7b. In order to achieve a good frequency selectivity, modern audio encoders typically use a block overlap. One such case is illustrated in FIG. 7a. First, for example, 2048 time-discrete audio samples are taken and windowed by means of means 402. The window embodying the means 402 has a window length of 2N samples and provides a block of 2N windowed samples on the output side. In order to achieve a window overlap, a second block of 2N windowed samples is formed by means of means 404 which, in FIG. 7a, is illustrated separate from the means 402 only for reasons of clarity. However, the 2048 samples supplied to the means 404 are not the time-discrete audio samples directly following the first window, but contain the second half of the samples windowed by the means 402 and additionally contain only 1024 "new" samples. The overlap is illustrated symbolically by means 406 in FIG. 7a, which causes an overlap degree of 50%. Both the 2N windowed samples output by the means 402 and the 2N windowed samples output by the means 404 are then subjected to the MDCT algorithm by means of means 408 and/or 410. The means 408 provides N spectral values for the first window according to the known MDCT algorithm, while the means 410 also provides N spectral values, but for the second window, wherein there is an overlap of 50% between the first window and the second window.

In the decoder, the N spectral values of the first window, as shown in FIG. 7b, are supplied to means 412 which performs an inverse modified discrete cosine transform. The same applies to the N spectral values of the second window. They are supplied to means 414 which also performs an inverse modified discrete cosine transform. Both the means 412 and the means 414 each provide 2N samples for the first window and 2N samples for the second window, respectively.

In means 416, designated TDAC (time domain aliasing cancellation) in FIG. 7b, the fact is taken account of that the two windows are overlapping. In particular, a sample $y_1$ of the second half of the first window, i.e. with an index N+k, is summed with a sample $y_2$ from the first half of the second window, i.e. with an index k, so that N decoded temporal samples result on the output side, i.e. in the decoder.

It is to be noted that, by the function of the means 416 also referred to as add function, the windowing performed in the encoder schematically illustrated in FIG. 7a is considered automatically, as it were, so that no explicit "inverse windowing" has to be performed in the decoder illustrated in FIG. 7b.

If the window function implemented by the means 402 or 404 is designated w(k), wherein the index k represents the time index, the condition must be fulfilled that the square window weight w(k) added to the square window weight w(N+k) together yield 1, wherein k runs from 0 to N−1. If a sine window is used whose window weightings follow the first half wave of the sine function, this condition is always fulfilled, as the square of the sine and the square of the cosine together yield the value 1 for any angle.

Figure 8:
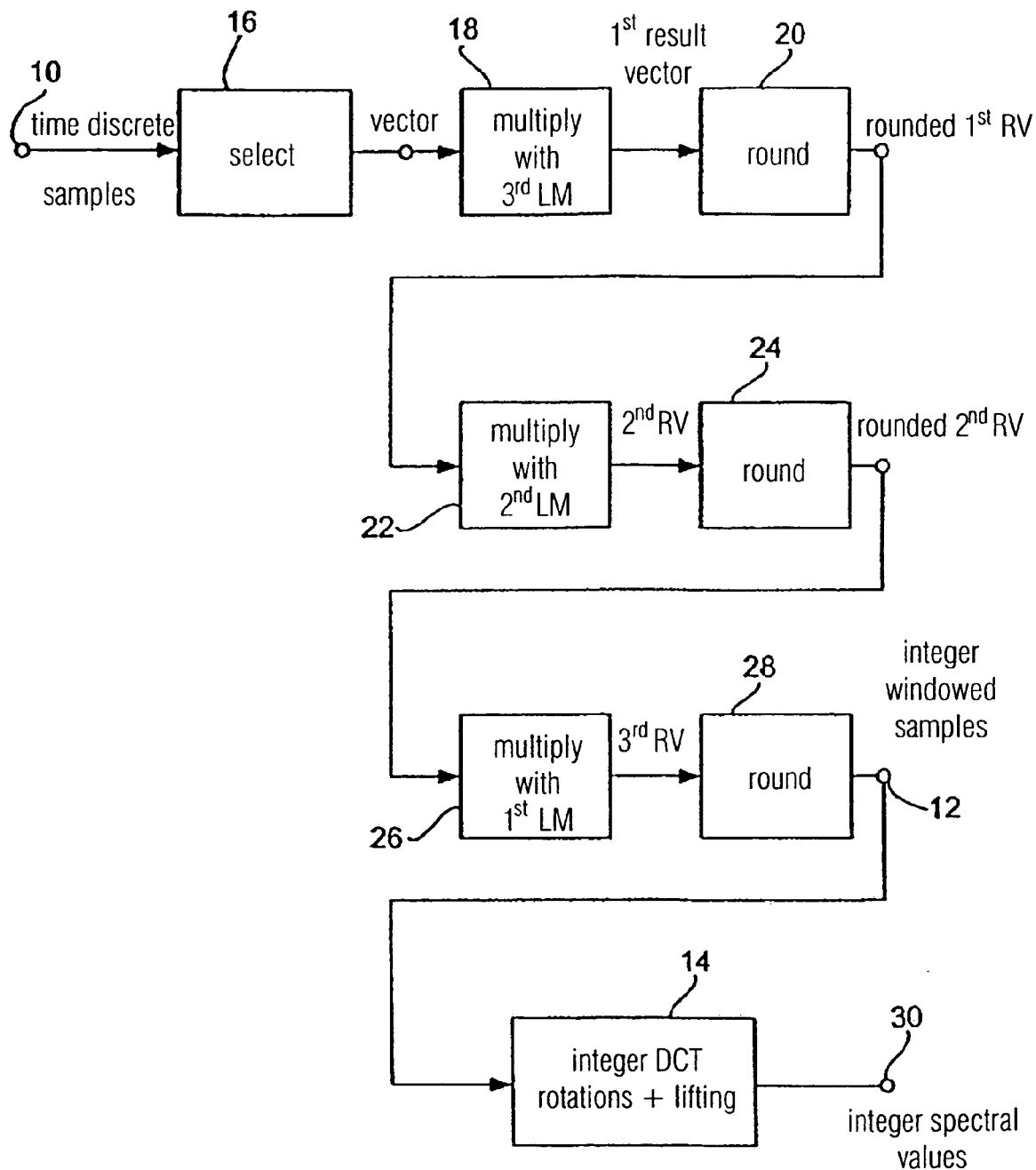
FIG. 8 is a block circuit diagram of preferred means for processing time-discrete audio samples to obtain integer values from which integer spectral values may be averaged.

FIG. 8 shows an overview diagram for the inventive preferred device for processing time-discrete samples representing an audio signal to obtain integer values based on which the Int-MDCT integer transform algorithm operates. The time-discrete samples are windowed by the device shown in FIG. 8 and optionally converted to a spectral representation. The time-discrete samples supplied to the device at an input 10 are windowed with a window w with a length corresponding to 2N time-discrete samples to achieve, at an output 12, integer windowed samples suitable to be converted to a spectral representation by means of a transform and particularly the means 14 for performing an integer DCT. The integer DCT is designed to generate N output values from N input values which is in contrast to the MDCT function 408 of FIG. 7a which only generates N spectral values from 2N windowed samples due to the MDCT equation.

For windowing the time-discrete samples, first two time-discrete samples are selected in means 16 which together represent a vector of time-discrete samples. A time-discrete sample selected by the means 16 is in the first quarter of the window. The other time-discrete sample is in the second quarter of the window, as discussed in more detail with respect to FIG. 10. The vector generated by the means 16 is now provided with a rotation matrix of the dimension 2×2, wherein this operation is not performed directly, but by means of several so-called lifting matrices.

A lifting matrix has the property to comprise only one element depending on the window w and being unequal to "1" or "0".

The factorization of wavelet transforms in lifting steps is presented in the specialist publication "Factoring Wavelet Transforms Into Lifting Steps", Ingrid Daubechies and Wim Sweldens, Preprint, Bell Laboratories, Lucent Technologies, 1996. Generally, a lifting scheme is a simple relation between perfectly reconstructing filter pairs having the same low-pass or high-pass filters. Each pair of complementary filters may be factorized into lifting steps. This applies particularly to Givens rotations. Consider the case in which the polyphase matrix is a Givens rotation. The following then applies:

$$\begin{pmatrix} \cos\alpha & -\sin\alpha \\ \sin\alpha & \cos\alpha \end{pmatrix} = \begin{pmatrix} 1 & \frac{\cos\alpha - 1}{\sin\alpha} \\ 0 & 1 \end{pmatrix} \begin{pmatrix} 1 & 0 \\ \sin\alpha & 1 \end{pmatrix} \begin{pmatrix} 1 & \frac{\cos\alpha - 1}{\sin\alpha} \\ 0 & 1 \end{pmatrix} \quad (1)$$

Each of the three lifting matrices on the right side of the equal sign has the value "1" as main diagonal element. There is further, in each lifting matrix, a secondary diagonal element equal to 0 and a secondary diagonal element depending on the rotation angle α.

The vector is now multiplied with the third lifting matrix, i.e. the lifting matrix on the far right in the above equation, to obtain a first result vector. This is illustrated in FIG. 8 by means 18. Now the first result vector is rounded with any rounding function mapping the set of real numbers in the set of integers, as is illustrated in FIG. 8 by means 20. At the output of the means 20, a rounded first result vector is obtained. The rounded first result vector is now supplied to means 22 for multiplying it with the central, i.e. second, lifting matrix to obtain a second result vector which is again rounded in means 24 to obtain a rounded second result vector. The rounded second result vector is now supplied to means 26 for multiplying it with the lifting matrix shown on the left of the above equation, i.e. the first one, to obtain a third result vector which is finally rounded by means of means 28 to finally obtain integer windowed samples at the output 12 which, if a spectral representation of the same is desired, now have to be processed by means 14 to obtain integer spectral values at a spectral output 30.

Preferably, the means 14 is implemented as integer DCT.

The discrete cosine transform according to type 4 (DCT-IV) with a length N is given by the following equation:

$$X_t(m) = \sqrt{\frac{2}{N}} \sum_{k=0}^{N-1} x(k)\cos\left(\frac{\pi}{4N}(2k+1)(2m+1)\right) \quad (2)$$

The coefficients of the DCT-IV form an orthonormal N×N matrix. Each orthogonal N×N matrix may be decomposed into N(N−1)/2 Givens rotations, as is discussed in the specialist publication P. P. Vaidyanathan, "Multirate Systems And Filter Banks", Prentice Hall, Englewood Cliffs, 1993. It is to be noted that other decompositions also exist.

With respect to the classifications of the various DCT algorithms, see H. S. Malvar, "Signal Processing With Lapped Transforms", Artech House, 1992. Generally, the DCT algorithms differ in the kind of their basis functions. While the DCT-IV preferred here includes non-symmetrical basis functions, i.e. a cosine quarter wave, a cosine ¾ wave, a cosine 5/4 wave, a cosine 7/4 wave, etc., the discrete cosine transform of, for example, type II (DCT-II) has axis symmetric and point symmetric basis functions. The $0^{th}$ basis function has a DC component, the first basis function is half a cosine wave, the second basis function is a whole cosine wave, etc. Due to the fact that the DCT-II gives special emphasis to the DC component, it is used in video encoding, but not in audio encoding, because the DC component is not relevant in audio encoding in contrast to video encoding.

In the following, there will be a discussion how the rotation angle α of the Givens rotation depends on the window function.

An MDCT with a window length of 2N may be reduced to a discrete cosine transform of the type IV with a length N. This is achieved by the TDAC operation being performed explicitly in the time domain and then the DCT-IV being applied. In the case of a 50% overlap, the left half of the window for a block t overlaps with the right half of the preceding block, i.e. block t−1. The overlapping part of two consecutive blocks t−1 and t is preprocessed in the time domain, i.e. prior to the transform, as follows, i.e. it is processed between the input 10 and the output 12 of FIG. 8:

$$\begin{pmatrix} \tilde{x}_t(k) \\ \tilde{x}_{t-1}(N-1-k) \end{pmatrix} = \quad (3)$$

-continued
$$\begin{pmatrix} w\left(\frac{N}{2}+k\right) & -w\left(\frac{N}{2}-1-k\right) \\ w\left(\frac{N}{2}-1-k\right) & w\left(\frac{N}{2}+k\right) \end{pmatrix} \begin{pmatrix} x_t\left(\frac{N}{2}+k\right) \\ x_t\left(\frac{N}{2}-1-k\right) \end{pmatrix}$$

The values marked with the tilde are the values at the output 12 of FIG. 8, while the x values not marked with a tilde in the above equation are the values at the input 10 and/or following the means 16 for selecting. The running index k runs from 0 to N/2−1, while w represents the window function.

From the TDAC condition for the window function w, the following applies:

$$w\left(\frac{N}{2}+k\right)^2 + w\left(\frac{N}{2}-1-k\right)^2 = 1 \quad (4)$$

For certain angles $\alpha_k$, k=0, . . . , N/2−1, this preprocessing in the time domain may be written as Givens rotation, as discussed.

The angle α of the Givens rotation depends on the window function w as follows:

$$\alpha = \arctan\left[w(N/2-1-k)/w(N/2+k)\right] \quad (5)$$

It is to be noted that any window functions w may be employed as long as they fulfill this TDAC condition.

In the following, a cascaded encoder and decoder are described with respect to FIG. 9. The time-discrete samples x(0) to x(2N−1) which are "windowed" together by a window are first selected by the means 16 of FIG. 8 such that the sample x(0) and the sample x(N−1), i.e. a sample from the first quarter of the window and a sample from the second quarter of the window, are selected to form the vector at the output of the means 16. The crossing arrows schematically represent the lifting multiplications and subsequent roundings of the means 18, 20 and 22, 24 and 26, 28, respectively, to obtain the integer windowed samples at the input of the DCT-IV blocks.

When the first vector has been processed as described above, a second vector is further selected from the samples x(N/2−1) and x(N/2), i.e. again a sample from the first quarter of the window and a sample from the second quarter of the window, and is again processed by the algorithm described in FIG. 8. Analogously, all other sample pairs from the first and second quarters of the window are processed. The same processing is performed for the third and fourth quarters of the first window. Now there are 2N windowed integer samples at the output 12 which are now supplied to a DCT-IV transform as illustrated in FIG. 9. In particular, the integer windowed samples of the second and third quarters are supplied to a DCT. The windowed integer samples of the first quarter of the window are processed in a preceding DCT-IV together with the windowed integer samples of the fourth quarter of the preceding window. Analogously, in FIG. 9, the fourth quarter of the windowed integer samples is supplied to a DCT-IV transform together with the first quarter of the next window. The central integer DCT-IV transform 32 shown in FIG. 9 now provides N integer spectral values y(0) to y(N−1). These integer spectral values may now, for example, be simply entropy-encoded without an interposed quantization being necessary, because the windowing and transform yield integer output values.

Figure 9:
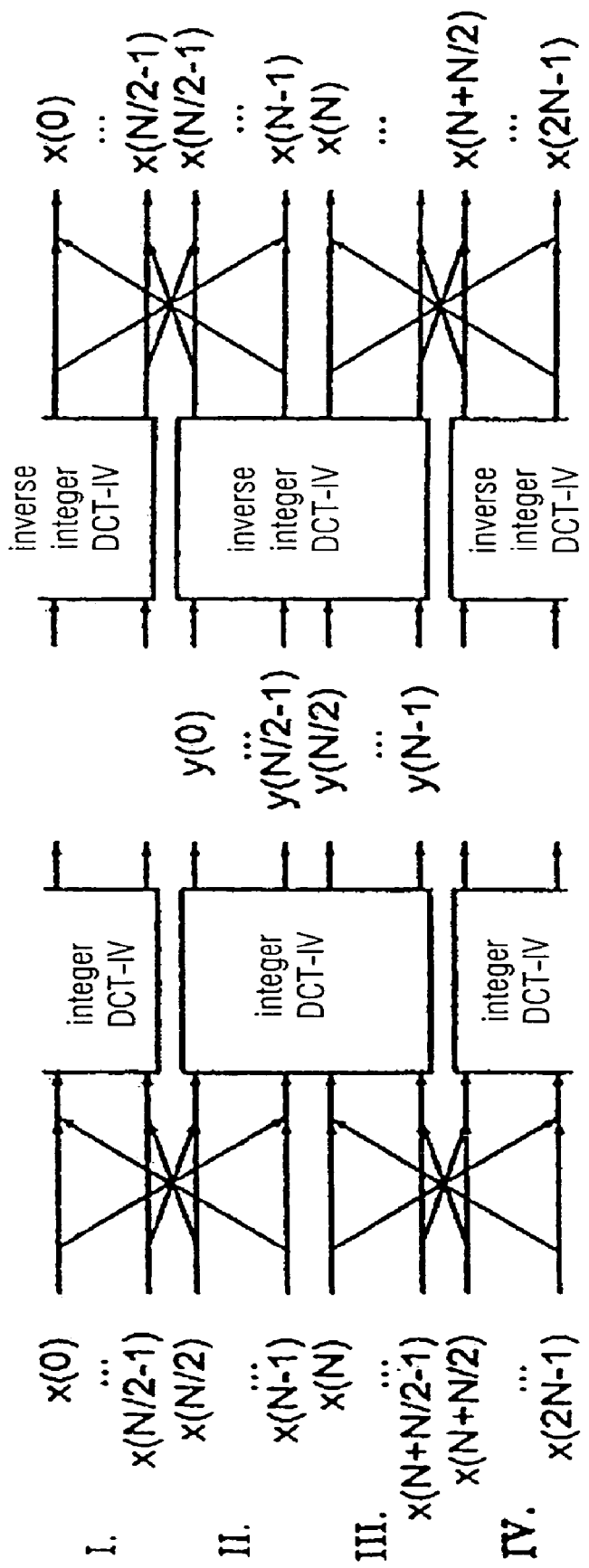
FIG. 9 is a schematic illustration of the decomposition of an MDCT and an inverse MDCT in givens rotations and two DCT-IV operations.
Figure 10:
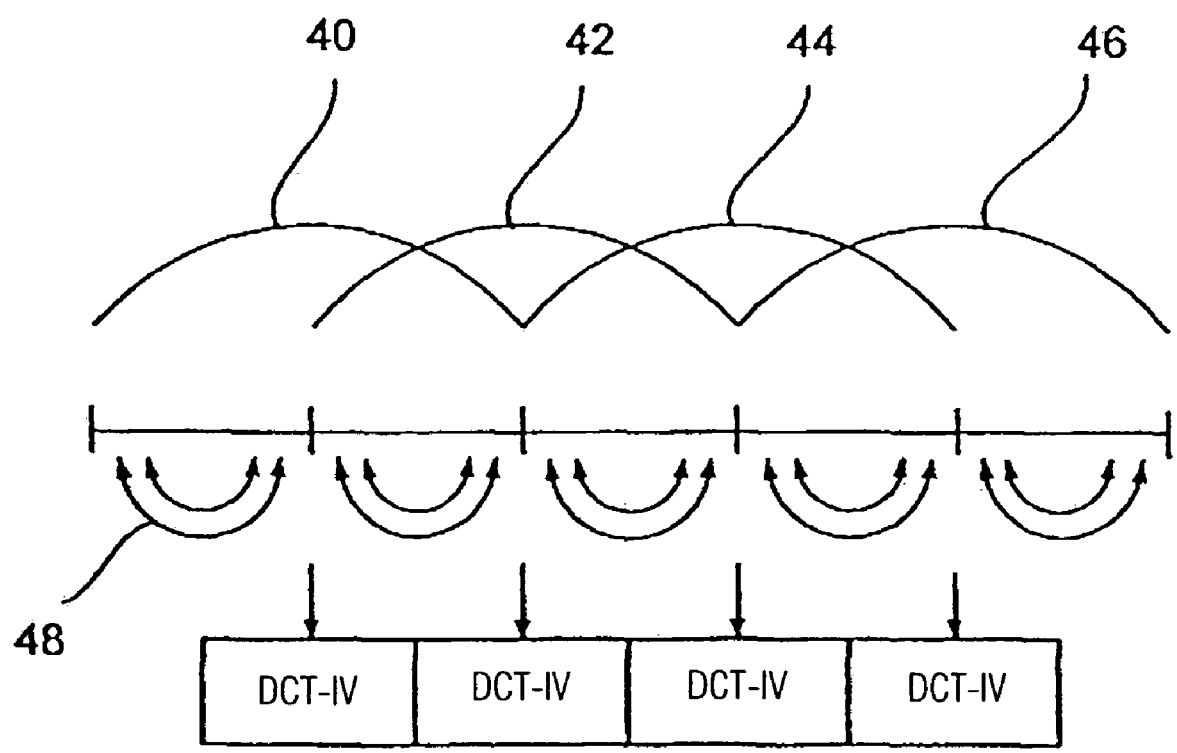
FIG. 10 is an illustration for illustrating the decomposition of the MDCT with 50 percent overlap in rotations and DCT-IV operations.

In the right half of FIG. 9, a decoder is illustrated. The decoder consisting of back transform and "inverse windowing" operates inversely to the encoder. It is known that an inverse DCT-IV may be used for the back transform of a DCT-IV, as illustrated in FIG. 9. The output values of the decoder DCT-IV 34 are now inversely processed with the corresponding values of the preceding transform and/or the following transform, as illustrated in FIG. 9, in order to generate again time-discrete audio samples x(0) to x(2−N1) from the integer windowed samples at the output of the means 34 and/or the preceding and following transform.

The operation on the output side takes place by an inverse Givens rotation, i.e. such that the blocks 26, 28 and 22, 24 and 18, 20, respectively, are passed in the opposite direction. This will be illustrated in more detail with respect to the second lifting matrix of equation 1. When (in the encoder) the second result vector is formed by multiplication of the rounded first result vector with the second lifting matrix (means 22), the following expression results:

$$(x,y) \mapsto (x, y + x \sin \alpha) \quad (6)$$

The values x, y on the right side of equation 6 are integers. This, however, does not apply to the value $x \sin \alpha$. Here, the rounding function r must be introduced, as illustrated in the following equation:

$$(x,y) \mapsto (x, y + r(x \sin \alpha)) \quad (7)$$

This operation is performed by the means 24.

The inverse mapping (in the decoder) is defined as follows:

$$(x',y') \mapsto (x', y' - r(x' \sin \alpha)) \quad (8)$$

Due to the minus sign in front of the rounding operation, it becomes apparent that the integer approximation of the lifting step may be reversed without introducing an error. The application of this approximation to each of the three lifting steps leads to an integer approximation of the Givens rotation. The rounded rotation (in the encoder) may be reversed (in the decoder) without introducing an error by passing the inverse rounded lifting steps in the opposite order, i.e. if in decoding the algorithm of FIG. 8 is performed from bottom to top.

If the rounding function r is point symmetrical, the inverse rounded rotation is identical to the rounded rotation with the angle $-\alpha$ and is expressed as follows:

$$\begin{pmatrix} \cos\alpha & \sin\alpha \\ -\sin\alpha & \cos\alpha \end{pmatrix} \quad (9)$$

The lifting matrices for the decoder, i.e. for the inverse Givens rotation, in this case result directly from equation (1) by merely replacing the expression "$\sin \alpha$" by the expression "$-\sin \alpha$".

In the following, the decomposition of a common MDCT with overlapping windows 40 to 46 is illustrated again with respect to FIG. 10. The windows 40 to 46 each have a 50% overlap. First, Givens rotations are performed per window within the first and second quarters of a window and/or within the third and fourth quarters of a window, as illustrated schematically by arrows 48. Then the rotated values, i.e. the windowed integer samples, are supplied to an N-to-N DCT such that always the second and third quarters of a window and the fourth and first quarters of a subsequent window, respectively, are converted together by means of a DCT-IV algorithm in a spectral representation.

The common Givens rotation is therefore decomposed into lifting matrices which are executed sequentially, wherein, after each lifting matrix multiplication, a rounding step is inserted such that the floating point numbers are rounded immediately after being generated such that, before each multiplication of a result vector with a lifting matrix, the result vector only has integers.

The output values thus always remain integer, wherein it is preferred to use also integer input values. This does not represent a limitation, because any exemplary PCM samples as they are stored on a CD are integer numerical values whose value range varies depending on bit width, i.e. depending on whether the time-discrete digital input values are 16-bit values or 24-bit values. Nevertheless, the whole process is invertible, as discussed above, by performing the inverse rotations in the opposite order. There is thus an integer approximation of the MDCT with perfect reconstruction, i.e. a lossless transform.

The shown transform provides integer output values instead of floating point values. It provides a perfect reconstruction so that no error is introduced when a forward and then a backward transform are performed. According to a preferred embodiment of the present invention, the transform is a substitution for the modified discrete cosine transform. Other transform methods, however, may also be performed with integers as long as a decomposition into rotations and a decomposition of the rotations into lifting steps is possible.

The integer MDCT has the most favorable properties of the MDCT. It has an overlapping structure, whereby a better frequency selectivity is obtained than with non-overlapping block transforms. Due to the TDAC function which is already taken into account in windowing prior to the transform, a critical sampling is maintained so that the total number of spectral values representing an audio signal is equal to the total number of input samples.

Compared to a normal MDCT providing floating point samples, the described preferred integer transform shows that the noise compared to the normal MDCT is increased only in the spectral domain in which there is little signal level, while this noise increase does not become apparent with significant signal levels. But the integer processing suggests itself for an efficient hardware implementation, because only multiplication steps are used which may readily be decomposed into shift/add steps which may be hardware-implemented in a simple and quick way. Of course, a software implementation is also possible.

Depending on the practical circumstances, the inventive embedding concept and/or the inventive extraction concept may be implemented in hardware or in software. The implementation may be done on a digital storage medium, particularly a disk or CD with control signals which may be read out electronically, which may cooperate with a programmable computer system so that the corresponding method is executed. Generally, the invention thus also consists in a computer program product with a program code stored on a machine-readable carrier for performing the inventive embedding method or the inventive extraction method when the computer program product runs on a computer. In other words, the invention thus represents a computer program with a program code for performing the method for embedding and/or for extracting when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A device for embedding binary payload into a carrier signal comprising a first sequence of discrete values, the device comprising:

a first converter for converting the first sequence of discrete values to a spectral representation using a forward integer transform algorithm configured to provide a set of integer binary spectral representation values representing frequencies in an ascending order, wherein spectral representation values to be modified comprise bits, and wherein a different valency is associated with each bit of a spectral representation value to be modified, wherein a set bit with a highest valency in the bits of the spectral representation value is a leading bit of the spectral representation value, and wherein all remaining bits of the spectral representation value have a lower valency than the leading bit;

a determiner for determining signal limit valencies for the spectral representation values, wherein the signal limit valencies are at least one valency level below a valency of the respective leading bit of the spectral representation values;

a setter for setting bits of the spectral representation values whose valencies are equal to the signal limit valency or less than the signal limit valency according to the binary payload to obtain modified spectral representation values, wherein bits whose valencies are greater than the signal limit valencies are not available for payload embedding; and a second converter for converting a set of integer binary spectral representation values, in which the modified spectral representation values are contained instead of the spectral representation values to be modified, to a second sequence of discrete values using a backward integer transform algorithm so that the payload is embedded in the second sequence of values.

2. The device of claim 1, wherein the determiner for determining is configured to determine a respective signal limit valency for several binary spectral representation values, wherein the signal limit valency for each binary spectral representation value is below a valency of the leading bit of the corresponding spectral representation values by the same number of valency levels.

3. The device of claim 1, wherein the signal limit valency is three or more valency levels below the valency of the leading bit by.

4. The device according to claim 1, wherein the provider for providing is further configured to determine a quiet limit valency for the spectral representation value, without consideration for the valency of the leading bit of a spectral representation value, which is a predetermined number of valency levels higher than a lowest valency of a bit of the spectral representation value, so that the setter for setting sets bits with a valency less or equal to the quiet limit valency without consideration for a signal limit valency determined for a considered spectral representation value.

5. The device according to claim 1, wherein the information signal is an audio signal, and wherein the provider for providing is configured to determine the valency of a spectral representation value, using a psychoacoustic model as signal limit valency, which is higher by one valency level, equal to or less than a valency of a leading bit of a psychoacoustic masking threshold for the spectral representation value.

6. The device of claim 5, wherein the provider for providing is configured to set the signal limit valency of a spectral representation value one valency level lower than a leading bit of a psychoacoustic masking threshold for the spectral representation value.

7. The device of claim 5, wherein the determiner for determining is configured to calculate the psychoacoustic masking threshold using the psychoacoustic model, wherein only the leading bit or additionally a predetermined number of bits with lower valency are used for calculating the psychoacoustic masking threshold, and wherein the setter for setting is configured not to manipulate the leading bit of the spectral representation value or additionally the predetermined number of bits with lower valency of the spectral representation value.

8. The device according to claim 1,
wherein the information signal comprises several sequences of discrete values, wherein the setter for setting is further configured to insert redundancy bits in the set of integer binary spectral representation values, which include an indication of a start or an end of a sequence.

9. The device of claim 8, wherein the redundancy bits represent a checksum, wherein, in a number of consecutive sets of integer binary spectral representation values, checksums are inserted which have a predetermined relation to each other.

10. The device of claim 8, wherein the setter for setting is configured to use a set bit pattern as redundancy bits which is inserted by the setter for setting in bits with lower valency than a limit valency in one or more spectral representation values whose frequency and/or whose frequencies is/are above an average frequency of the set of binary spectral representation values.

11. The device of claim 8, wherein the first converter for converting is configured to vary a length of the first sequence depending on an information content of the carrier signal, wherein the setter for setting is configured to insert redundancy bits in each block.

12. The device according to claim 1,
wherein the first converter for converting is configured to convert a sequence including at least 128 and at the most 2048 discrete values.

13. The device according to claim 1, wherein the carrier signal is an audio CD-compatible audio signal.

14. The device according to claim 1, further comprising:
a redundancy-coder for redundancy-coding original payload to obtain the information to be inserted in binary form, wherein the payload represents the same information as the original payload, but includes a higher data redundancy than the original payload.

15. The device according to claim 1, wherein the payload is compressed video data, audio data or a compressed version of the carrier signal itself.

16. The device according to claim 1, wherein the forward integer transform algorithm and the backward integer transform algorithm include an IntMDCT algorithm.

17. A method performed by a computer system for embedding binary payload into a carrier signal comprising a first sequence of discrete values, the method comprising the computer-implemented steps of:

converting, by the computer system, the first sequence of discrete values to a spectral representation using a forward integer transform algorithm configured to provide a set of integer binary spectral representation values representing frequencies in an ascending order, wherein spectral representation values to be modified comprise bits, and wherein a different valency is associated with each bit of a spectral representation value to be modified, wherein a set bit with a highest valency in the bits of the spectral representation value is a leading bit of the spectral representation value, and wherein all remaining bits of the spectral representation value have a lower valency than the leading bit;

determining, by the computer system, signal limit valencies for the spectral representation values, wherein a signal limit valency is at least one valency level below a valency of the leading bit of the respective spectral representation value;

setting bits of the spectral representation values whose valencies are equal to the signal limit valency or less than the signal limit valency according to the binary payload to obtain modified spectral representation values, wherein bits whose valencies are greater than the signal limit valencies are not available for payload embedding; and converting, by the computer system, a set of integer binary spectral representation values, in which the modified spectral representation values are contained instead of the spectral representation values to be modified, to a second sequence of discrete values using a backward integer transform algorithm so that the payload is embedded in the second sequence of values.

18. A device for extracting payload from a modified carrier signal comprising a second sequence of discrete values in which the payload is inserted, wherein the payload is inserted by setting bits of spectral representation values which are spectral representation values from a set of integer binary spectral representation values, wherein the spectral representation values comprise bits, wherein a different valency is associated with each bit of a spectral representation value, wherein a set bit with a highest valency in the bits of the spectral representation value is a leading bit of the spectral representation value, and wherein all remaining bits of the spectral representation value have a lower valency than the leading bit, wherein the set of integer spectral representation values is generated via converting a first sequence of discrete values to a spectral representation using a forward integer transform algorithm, wherein the transform algorithm is configured to provide the set of integer binary spectral representation values representing frequencies in an ascending order, and wherein the set bits of the spectral representation value are bits whose valency is less than or equal to a signal limit valency, the device comprising:

a converter for converting the second sequence of samples using the forward integer transform algorithm to obtain an extraction set of integer binary spectral representation values representing frequencies in an ascending order;

a provider for providing information on signal limit valencies associated with the spectral representation values; and an extractor for extracting only the bits of the spectral representation values whose valencies are less than or equal to the signal limit valencies associated with the spectral representation values, wherein the extracted bits represent the binary payload.

19. The device of claim 18, wherein the provider is configured to provide stored signal limit valency data in the device for extracting, wherein the stored signal limit valency data are pre-set or contained as side information in the modified carrier signal.

20. The device of claim 19, wherein the side information is not embedded in the modified carrier signal.

21. The device according to claim 18, wherein, in embedding the payload, a quiet limit valency is used, without consideration for the valency of the leading bit of the spectral representation value, which is a predetermined number of valency levels higher than a lowest valency of a bit of the spectral representation value, wherein the provider for providing is configured to provide the quiet limit valency for a spectral representation value.

22. The device according to claim 18, wherein, in embedding the payload, the signal limit valency has been calculated using a psychoacoustic model, wherein the provider for providing is configured to determine the information on the signal limit valency for a spectral representation value using the same psychoacoustic model.

23. The device of claim 22, wherein, in embedding the payload, the signal limit valency has been calculated using the psychoacoustic model, wherein only the leading bits or additionally a predetermined number of bits with lower valency have been used for determining the masking threshold, wherein the provider for providing is configured to use only the leading bit or additionally a predetermined number of bits with lower valency of the extraction set of integer binary spectral representation values per spectral representation value for calculating the signal limit valency for a spectral representation value.

24. The device according to claim 18, wherein redundancy bits have been inserted in the embedding of information, and wherein the device for extracting further comprises a determiner for determining a block raster which has been used in the embedding of the information, wherein the determiner for determining of the block raster is configured to iteratively drive the converter for converting, the provider for providing and the extractor for extracting to extract the redundancy bits, and wherein the determiner for determining the block raster is further configured to identify a block raster as correct block raster in which the checksums of temporally consecutive blocks have a predetermined relation to each other.

25. The device of claim 24, wherein different block lengths are used in the embedding of information, and wherein the determiner for determining the block raster is further configured to drive the converter for converting to test various block lengths to identify a block length and a block raster as correct when extracted checksums for a plurality of blocks have a predetermined relation to each other.

26. The device according to claim 18, wherein the carrier signal is an audio signal, wherein the payload includes a compressed version of the audio signal, and which further comprises:

an interface for an interface connection of the device for extracting with a device for replaying the compressed audio signal.

27. The device of claim 26, wherein the interface is an interface for a portable device for replaying the compressed audio signal.

28. A method performed by a computer system for extracting payload from a modified carrier signal comprising a second sequence of discrete values in which the payload is inserted, wherein the payload is inserted by setting bits of spectral representation values which are spectral representation values from a set of integer binary spectral representation values, wherein the spectral representation values comprise bits, wherein a different valency is associated with each bit of a spectral representation value, wherein a set bit with a highest valency in the bits of the spectral representation value is a leading bit of the spectral representation value, and wherein all remaining bits of the spectral representation value have a lower valency than the leading bit, wherein the set of integer spectral representation values has been generated via converting a first sequence of discrete values to a spectral representation using a forward integer transform algorithm, wherein the transform algorithm is configured to provide the set of integer binary spectral representation values representing frequencies in an ascending order, and wherein the set bits of the spectral representation value are bits whose valency is less than or equal to a signal limit valency, the method comprising the computer-implemented steps of:

- converting, by the computer system, the second sequence of samples using the forward integer transform algorithm to obtain an extraction set of integer binary spectral representation values representing frequencies in an ascending order;
- providing information on signal limit valencies associated with the spectral representation values; and
- extracting only the bits of the spectral representation values whose valencies are less than or equal to the signal limit valencies associated with the spectral representation values, wherein the extracted bits represent the binary payload.

29. A digital storage medium having stored thereon a computer program for performing a method for embedding binary payload into a carrier signal comprising a first sequence of discrete values, the method comprising the steps of: converting the first sequence of discrete values to a spectral representation using a forward integer transform algorithm configured to provide a set of integer binary spectral representation values representing frequencies in an ascending order, wherein spectral representation values to be modified comprise bits, and wherein a different valency is associated with each bit of a spectral representation value to be modified, wherein a set bit with a highest valency in the bits of the spectral representation value is a leading bit of the spectral representation value, and wherein all remaining bits of the spectral representation value have a lower valency than the leading bit; determining signal limit valencies for the spectral representation values, wherein a signal limit valency is at least one valency level below a valency of the leading bit of the respective spectral representation value; setting bits of the spectral representation values whose valencies are equal to the signal limit valency or less than the signal limit valency according to the binary payload to obtain modified spectral representation values, wherein bits whose valencies are greater than the signal limit valencies are not available for payload embedding; and converting a set of integer binary spectral representation values, in which the modified spectral representation values are contained instead of the spectral representation values to be modified, to a second sequence of discrete values using a backward integer transform algorithm so that the payload is embedded in the second sequence of values.

30. A digital storage medium having stored thereon a computer program for performing a method for extracting payload from a modified carrier signal comprising a second sequence of discrete values in which the payload is inserted, wherein the payload is inserted by setting bits of spectral representation values which are spectral representation values from a set of integer binary spectral representation values, wherein the spectral representation values comprise bits, wherein a different valency is associated with each bit of a spectral representation value, wherein a set bit with a highest valency in the bits of the spectral representation value is a leading bit of the spectral representation value, and wherein all remaining bits of the spectral representation value have a lower valency than the leading bit, wherein the set of integer spectral representation values has been generated via converting a first sequence of discrete values to a spectral representation using a forward integer transform algorithm, wherein the transform algorithm is configured to provide the set of integer binary spectral representation values representing frequencies in an ascending order, and wherein the set bits of the spectral representation value are bits whose valency is less than or equal to a signal limit valency, the method comprising the steps of: converting the second sequence of samples using the forward integer transform algorithm to obtain an extraction set of integer binary spectral representation values representing frequencies in an ascending order; providing information on signal limit valencies associated with the spectral representation values; and extracting only the bits of the spectral representation values whose valencies are less than or equal to the signal limit valencies associated with the spectral representation values, wherein the extracted bits represent the binary payload.

* * * * *